(12) United States Patent
Umekage et al.

(10) Patent No.: US 8,099,248 B2
(45) Date of Patent: *Jan. 17, 2012

(54) FLOW RATE MEASURING DEVICE, AND GAS SUPPLY SYSTEM EMPLOYING IT, METHOD FOR SPECIFYING GAS APPLIANCE

(75) Inventors: Yasuhiro Umekage, Shiga (JP); Hajime Miyata, Nara (JP); Kenichi Kamon, Nara (JP)

(73) Assignee: Panasonic Corporation, Osaka (JP)

( * ) Notice: Subject to any disclaimer, the term of this patent is extended or adjusted under 35 U.S.C. 154(b) by 288 days.

This patent is subject to a terminal disclaimer.

(21) Appl. No.: 12/477,407

(22) Filed: Jun. 3, 2009

(65) Prior Publication Data

US 2009/0240445 A1    Sep. 24, 2009

Related U.S. Application Data

(63) Continuation of application No. PCT/JP2007/073752, filed on Dec. 10, 2007.

(30) Foreign Application Priority Data

Dec. 11, 2006    (JP) .................................. 2006-332988

(51) Int. Cl.
*G01F 1/00* (2006.01)

(52) U.S. Cl. ................ 702/45; 702/12; 702/50; 702/52; 702/100; 702/106; 702/179; 702/180; 702/181; 702/189; 73/861; 700/282

(58) Field of Classification Search .................... 702/12, 702/45, 50, 82, 100, 106, 179–181, 189; 73/861; 700/282

See application file for complete search history.

(56) References Cited

FOREIGN PATENT DOCUMENTS

| JP | 2002-71421 | | 3/2002 |
|---|---|---|---|
| JP | 2002-174542 | | 6/2002 |
| JP | 2003-149027 | * | 5/2003 |
| JP | 2003-149075 | | 5/2003 |
| JP | 2003-194331 | | 7/2003 |
| JP | 2003-194331 A | | 7/2003 |
| JP | 2006-023165 | | 1/2006 |
| JP | 2006-133017 | | 5/2006 |
| JP | 2006-200801 | | 8/2006 |
| JP | 2006-313114 | | 11/2006 |
| JP | 2006-317205 | | 11/2006 |

OTHER PUBLICATIONS

International Search Report mailed Jan. 28, 2008 for PCT/JP2007/073752, 2 pages.

* cited by examiner

*Primary Examiner* — Sujoy Kundu
(74) *Attorney, Agent, or Firm* — Brinks Hofer Gilson & Lione

(57) ABSTRACT

A flow rate measuring device has a flow rate measurement unit, an appliance registering unit, a calculating unit, a determining unit, a first appliance identifying unit, and a second appliance identifying unit. The appliance registering unit stores at least first gas flow rate variation profiles on activation of respective gas appliances coupled to a flow channel, and second gas flow rate variation profiles based on the control specific to the respective gas appliances. The first appliance identifying unit identifies which gas appliance is activated based on the first gas flow rate variation profiles on activation. When a determining unit detects a stop of any of gas appliances, the second appliance identifying unit identifies a gas appliance in continuous use by using the second gas flow rate variation profiles based on the control specific to the respective gas appliances.

24 Claims, 18 Drawing Sheets

|  | Activation determination value (L/h) | Tolerance (L) |
|---|---|---|
| Appliance A | 125 | ±5 |
| Appliance B | 110 | +5  -40 |
| Appliance C | 150 or larger and smaller than 500 | - |
| Appliance D | 500 or larger | - |

FIG. 9

| | Appliance A | Appliance B | Appliances C and D |
|---|---|---|---|
| Count number | 4 to 8 | 1 to 2 | 10 or more |

FIG. 15

| | Used flow rate range (L/h) |
|---|---|
| Appliance A | 50 to 130 |
| Appliance B | 20 to 120 |
| Appliance C | 150 to 500 |
| Appliance D | 500 or larger |

FIG. 16

| | Used flow rate range (L/h) | Duration(min.) |
|---|---|---|
| Appliance A | 50 to 130 | 30 or longer |
| Appliance B Appliance C | 50 to 120 | shorter than 30 |
| | 20 to smaller than 50 | shorter than 180 |
| Appliance D | 150 to 500 | - |
| Appliance A | 500 or larger | shorter than 20 |

| T1 | T2 | T3 | T4 | T5 | Q1 | Q2 | Q3 | Q4 | Q5 |
|---|---|---|---|---|---|---|---|---|---|
| 2.5 | 4.5 | 13 | - | - | 43 | 145 | 205 | - | - |

Pattern table

FLOW RATE MEASURING DEVICE, AND GAS SUPPLY SYSTEM EMPLOYING IT, METHOD FOR SPECIFYING GAS APPLIANCE

RELATED APPLICATIONS

This application is a continuation of PCT/JP2007/073752, filed on Dec. 10, 2007, which claims priority to Japanese Application No. JP2006-332988, filed on Dec. 11, 2006. The entire contents of these applications are incorporated herein by reference.

BACKGROUND OF THE INVENTION

1. Field of the Invention

The present invention relates to a flow rate measuring device that is installed at the inlet of a gas supply pipe in each household and is applied to a gas meter for measuring the gas flow rate. Specifically, the present invention relates to a technique for applying such a gas meter and identifying (specifying) a gas appliance in use in order to provide a new billing scheme and service, such as a fee by gas appliance, responsive to a used appliance type and its using method.

2. Background Art

A gas meter having a built-in gas flow rate measuring device is generally attached to the inlet of a gas supply line in each household. A billing scheme for setting a fee by gas appliance is implemented. When such a billing scheme is implemented using a conventional gas meter, a plurality of integrators connected to the gas meter are used. The integrated flow rate when the meter is used for a specific time period, and the integrated value when flow rate of a specific range is used are determined. In other words, flow rate by time zone and flow rate by flow rate zone are determined. A billing scheme is determined based on the integrated values.

An example of the billing scheme is described with reference to FIG. 20. In the billing scheme by gas appliance, a predetermined discount flow rate zone and a predetermined discount time zone are set in advance, and a discount is applied to the gas fees for flow rates corresponding to the discount flow rate zone and the discount time zone. Thus, the shaded areas shown in FIG. 20 correspond to the zones subject to the discount (for example, Patent Document 1).

However, this method falls into ambiguity in identifying an appliance. Therefore, it is difficult to perform fee setting, such as billing for a specific appliance, that is easier to understand and convenient for customers. Accordingly, a method for identifying a specific appliance is proposed as described below.

FIG. 21 shows a gas flow rate variation profile on activation of a certain gas appliance, and reference values (profile table) for performing profile matching based on the profile. Using the profile table, the variation of the flow rate value measured by a flow rate measuring device of a gas meter is always compared with the profile table and a matching value is extracted, thereby identifying a gas appliance (for example, Patent Document 2). In other words, the profile table is required to be prepared correspondingly to the flow rate variation profiles of a series of gases generated by combustion control of one gas appliance. The number of required profile tables is the total number of gas appliances used in each household.

In order to determine a stop of a gas appliance in the conventional configuration, flow rate variation is detected, and the occurrence or not of the stop of the gas appliance is determined. However, when a plurality of gas appliances are operated, it is difficult in some situations to identify which gas appliance has stopped. In other words, generally, when the operating flow rate of each gas appliance is accurately obtained, it can be identified which gas appliance has stopped by comparing the flow rate reduced by the stop with the operating flow rate. When the operating flow rates of two gas appliances are the same by chance, however, the possibility of incorrectly determining the stop increases. Therefore, the determining accuracy of the flow rate used in the gas appliance reduces, disadvantageously.

Patent document 1: Japanese Patent Unexamined Publication No. 2002-71421

Patent document 2: Japanese Patent Unexamined Publication No. 2003-149027

SUMMARY OF THE INVENTION

The present invention provides a flow rate measuring device allowing the determining accuracy of the flow rate to be maximized even when one of a plurality of gas appliances stops during operation of them and the determination of the stopping gas appliance is difficult. The flow rate measuring device of the present invention has a flow rate measurement unit, an appliance registering unit, a calculating unit, a determining unit, a first appliance identifying unit, and a second appliance identifying unit. The flow rate measurement unit measures the gas flow rate flowing in a flow channel. The appliance registering unit stores at least first gas flow rate variation profiles on activation of a first gas appliance and a second gas appliance, respectively, which are connected to the flow channel, and second gas flow rate variation profiles based on the control specific to each of the first gas appliance and the second gas appliance. The calculating unit determines a differential value of the flow rate value data output from the flow rate measurement unit. The determining unit compares the differential value determined by the calculating unit with a preset variation determination value, and determines that the states of the first gas appliance and the second gas appliance vary when the differential value is larger than the variation determination value. The first appliance identifying unit compares the gas flow rate variation profile measured by the flow rate measurement unit with the first gas flow rate variation profiles on activation stored in the appliance registering unit, thereby identifying the activated first gas appliance and second gas appliance. The calculating unit determines the differential value based on the variation of the gas flow rate measured by the flow rate measurement unit, and the determining unit detects a stop of one of the first gas appliance and second gas appliance based on the calculated differential value. Then, the second appliance identifying unit compares a gas flow rate variation profile after the stop detection with the second gas flow rate variation profiles based on the control stored in the appliance registering unit. Thus, a gas appliance in use is identified, and a gas appliance having stopped is identified, of gas appliances determined to be activated by the first appliance identifying unit.

Another flow rate measuring device of the present invention has a flow rate measurement unit, an appliance registering unit, and a first appliance identifying unit that are similar to those in the former flow rate measuring device, a flow rate storage unit, and a second appliance identifying unit. The flow rate storage unit stores a total gas flow rate variation profile. When the flow rate measurement unit detects that the gas flow rate has run out, the second appliance identifying unit compares a gas flow rate variation profile stored in the flow rate storage unit before the gas flow rate runs out with the second gas flow rate variation profiles based on the control stored in the appliance registering unit. Thus, the gas appliance having stopped later is identified. Of the gas appliances determined to be activated by the first appliance identifying unit, the gas appliance having stopped on ahead is identified.

Even when one gas appliance stops during operation of a plurality of gas appliances and it is difficult to identify the one gas appliance only based on the gas flow rate variation at the stop, the flow rate measuring device of the present invention can identify the one gas appliance. The flow rate measuring device can accurately identify a gas appliance, so that a new billing menu prepared by a gas utility or the like can be used. The gas appliance identifying function can be updated without changing the specification of the gas meter, so that future maintenance of the appliance function can be also facilitated.

BRIEF DESCRIPTION OF THE DRAWINGS

FIG. 9 is a table showing an example of determination values of flow rate control identification in the flow rate measuring device of FIG. 1.

FIG. 15 is a table showing an example of identifying a gas appliance in the flow rate measuring device of FIG. 1.

FIG. 16 is a table showing another example of identifying a gas appliance in the flow rate measuring device of FIG. 1.

DETAILED DESCRIPTION OF THE PREFERRED EMBODIMENTS

An exemplary embodiment of the present invention is described hereinafter with reference to the accompanying drawings. However, the present invention is not limited to the following exemplary embodiment.

Figure 1:
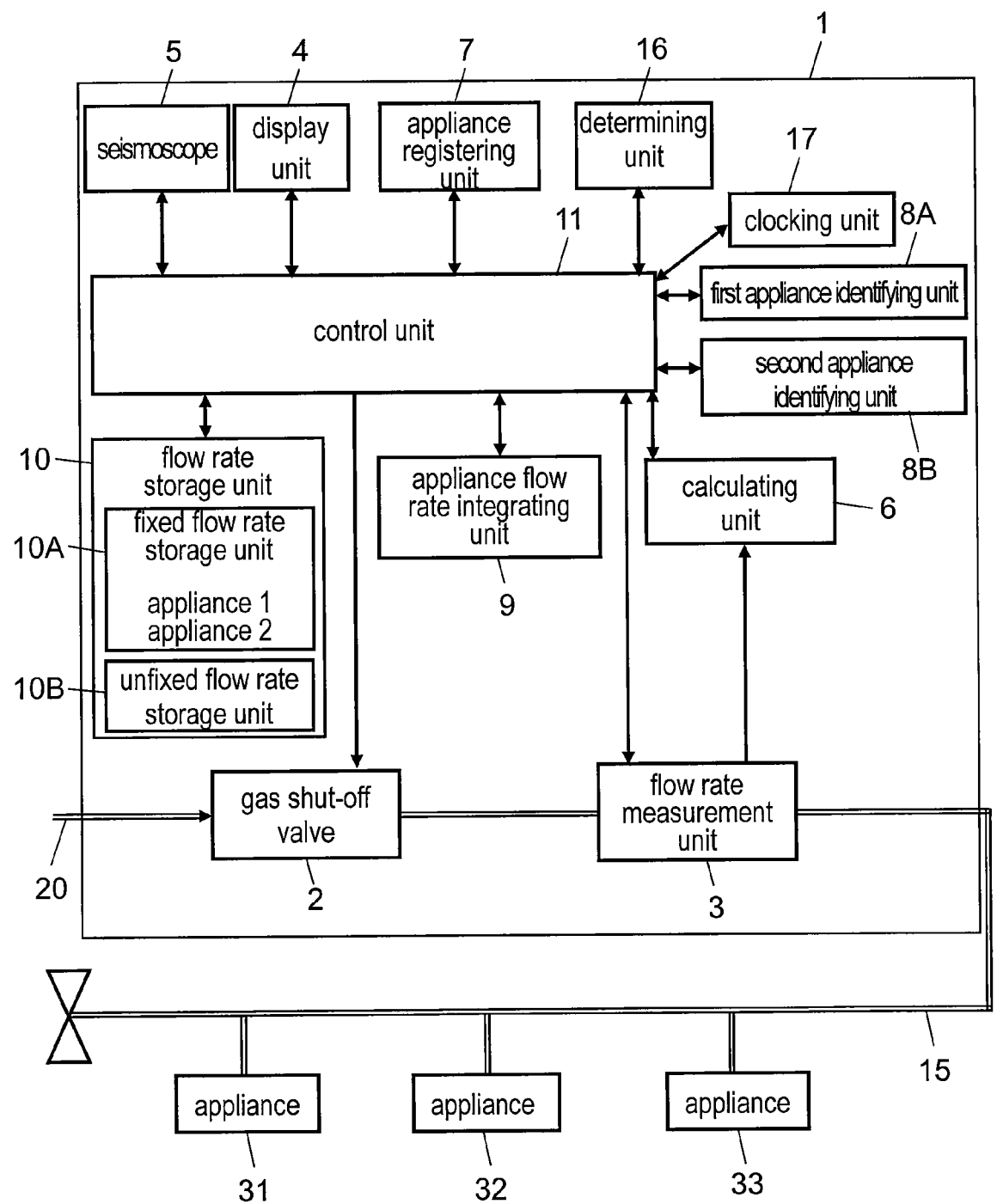
FIG. 1 is a function block diagram showing the configuration of a flow rate measuring device in accordance with an exemplary embodiment of the present invention.

FIG. 1 is a function block diagram showing the configuration of a flow rate measuring device in accordance with an exemplary embodiment of the present invention. Flow rate measuring device 1 is disposed in a midway of gas supply pipe 20, and a pipe as flow channel 15 on the downstream side thereof is connected to appliances 31 to 33, namely two or more appliances installed in each customer house. Appliances 31 to 33 are a first gas appliance, a second gas appliance, and a third gas appliance that are connected to flow channel 15.

The inside of flow rate measuring device 1 is provided with gas shut-off valve 2 and flow rate measurement unit 3 disposed in flow channel 15, display unit 4, seismoscope 5, calculating unit 6, and control unit 11. Flow rate measurement unit 3 measures the gas flow rate flowing in flow channel 15, and transmits a detected flow rate signal to control unit 11. Control unit 11 transmits the flow rate signal to calculating unit 6, and calculating unit 6 calculates the flow rate signal and determines the used gas flow rate. Calculating unit 6 determines the differential value of the flow rate value data output from flow rate measurement unit 3. Control unit 11 displays the determined used gas flow rate on display unit 4 in any display form such as a monthly amount used or integrated total amount used. Seismoscope 5 detects vibration such as an earthquake. When seismoscope 5 detects vibration of a predetermined value or more, control unit 11 operates gas shut-off valve 2 and shuts off flow channel 15.

Flow rate measuring device 1 further includes appliance registering unit 7, determining unit 16, first appliance identifying unit 8A, and second appliance identifying unit 8B. Appliance registering unit 7 stores a gas flow rate variation profile of each of appliances 31 to 33 at least on activation, and a gas flow rate variation profile based on the control specific to each of the gas appliances. Here, the gas flow rate variation profiles include a differential value of gas flow rate, variation of absolute flow rate, flow rate variation shape where the flow rate is plotted with respect to time axis, or periodicity of flow rate variation, as described later. The flow rate variation shape includes a shape in a short period of time and a shape in a long period of time. The shape in the short period of time includes overshoot, gradient (rate of variation), or control value. An example of control specific to the gas appliances is described later.

Determining unit 16 compares the differential value determined by calculating unit 6 with a preset variation determination value, and, when the differential value is larger than the variation determination value, determines that the state of at least one of appliances 31 to 33 has varied. First appliance identifying unit 8A compares the gas flow rate variation profile measured by flow rate measurement unit 3 with the gas flow rate variation profile on activation stored in appliance registering unit 7, thereby identifying the activated gas appliance. Determining unit 16 detects that some of appliances 31 to 33 have stopped based on the differential value determined by calculating unit 6. Second appliance identifying unit 8B compares the gas flow rate variation profile after the stop detection with the gas flow rate variation profile based on the control specific to each gas appliance stored in appliance registering unit 7. Thus, second appliance identifying unit 8B identifies which of appliances 31 to 33 is in use. Then, the gas appliance having stopped is identified, of gas appliances determined to be activated by first appliance identifying unit 8A.

In a situation where only one gas appliance is continuously used, the gas appliance in use is identified from the gas flow rate variation profile, and the gas appliance having stopped before it is identified. Therefore, the use and stop of each gas appliance can be certainly determined even in a stop determining part having the possibility of incorrect identification. Specifically, for example, when appliances 31 and 32 are activated, first appliance identifying unit 8A identifies the activation of these appliances. When appliance 31 stops on ahead, for example, second appliance identifying unit 8B identifies that appliance 32 is in use and identifies that appliance 31 has stopped.

More specifically, flow rate measuring device 1 further has appliance flow rate integrating unit 9 and flow rate storage unit 10. Appliance flow rate integrating unit 9 determines the flow rate used in each gas appliance identified by first appliance identifying unit 8A. Flow rate storage unit 10 has fixed flow rate storage unit 10A and unfixed flow rate storage unit 10B, and stores respective integrated flow rates determined by appliance flow rate integrating unit 9. These functions are described later. Control unit 11 organically associates respective units with each other and controls them, thus effectively operates the gas appliance identifying function, and executes various abnormal processings. Batteries (not shown) are installed as a power source.

In appliance registering unit 7, a variation determination value serving as a reference for determining whether or not the flow rate has varied and the determination values at the variation points (activation, control, and stop) in a series of combustion states of each gas appliance are stored as the gas flow rate variation profile. As appliance registering unit 7, semiconductor memory can be used, but a magnetic recording medium or the like can be also used as long as it can add or rewrite the recorded contents.

Flow rate measurement unit 3 includes an ultrasonic flow meter as an instantaneous flow rate measurement apparatus. Including the ultrasonic flow meter can facilitate instantaneous flow rate measurement every certain period of time. However, flow rate measurement unit 3 is not limited to this. As the measuring method, another flow rate measuring method such as a full click method can be used as long as continuous measurement can be performed in one cycle in a short time.

Figure 2:
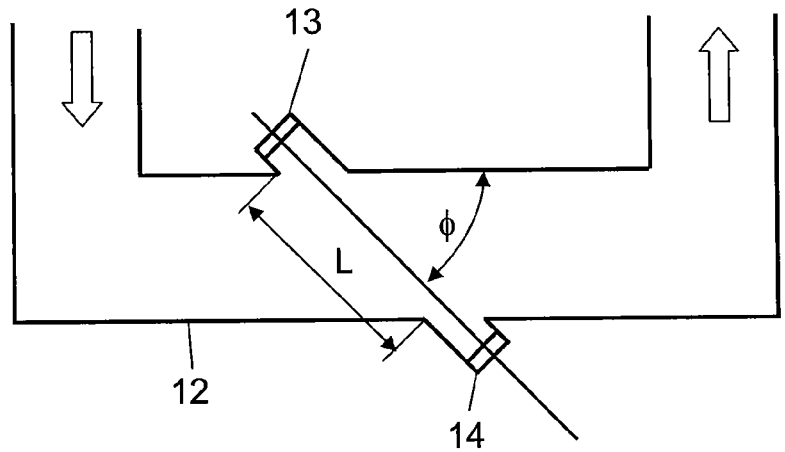
FIG. 2 is a schematic diagram of a flow rate measurement unit of the flow rate measuring device of FIG. 1.

Ultrasonic flow velocity measurement of flow rate measurement unit 3 is described using FIG. 2. FIG. 2 is a schematic diagram of a flow rate measurement unit of the flow rate measuring device of the present exemplary embodiment. Measurement flow channel 12 disposed in flow channel 15 has a rectangular cross section. A pair of ultrasonic transmitters and receivers 13 and 14 are disposed on both sides of measurement flow channel 12 on the walls perpendicular to the flow direction of gas in measurement flow channel 12. Ultrasonic transmitters and receivers 13 and 14 are obliquely faced to each other at an angle $\phi$ on the upstream side and the downstream side of measurement flow channel 12. A measurement control unit (not shown) of flow rate measurement unit 3 makes ultrasonic waves alternately transmitted and received between transmitters and receivers 13 and 14. Thus, the measurement control unit measures the difference between the propagation time of ultrasonic wave in the forward direction with respect to the flow of the fluid and the propagation time of ultrasonic wave in the reverse direction at constant time intervals, and outputs the measured difference as a propagation time difference signal. Flow rate measurement unit 3 receives this propagation time difference signal, and calculates the flow velocity and the flow rate of the fluid to be measured.

The calculation formula is described below. In FIG. 2, L is a measurement length. Assuming that t1 is a transmission time from the upstream, t2 is a transmission time from the downstream, and C is the speed of sound, flow velocity V can be obtained using formula (1)

$$V=(L/2\cos\phi)\times((1/t1)-(1/t2)) \quad (1)$$

The measurement time interval can be set within a range where the transmission and reception of ultrasonic wave is allowed. In the present embodiment, the measurement is performed at intervals of two seconds. The time interval can be shortened further in measurement principle. There are some gas appliances that are activated at time intervals shorter than two seconds, so that reducing the measurement time interval is advantageous for instantaneous appliance identification. For example, in a film type method used in a conventional gas meter, the measurement interval is in seconds on a two-digit order. While, when the measurement time interval is shortened, the battery exhaustion increases disadvantageously. When the measurement interval is in seconds on a two-digit order, it becomes difficult to determine the state variation of a gas appliance on the basis of a difference in flow rate variation in an algorithm described later. In consideration of these facts, in the present embodiment, the two-second measurement time interval is employed as a well-balanced time interval from the standpoint of cost and appliance identification performance.

Figure 3:
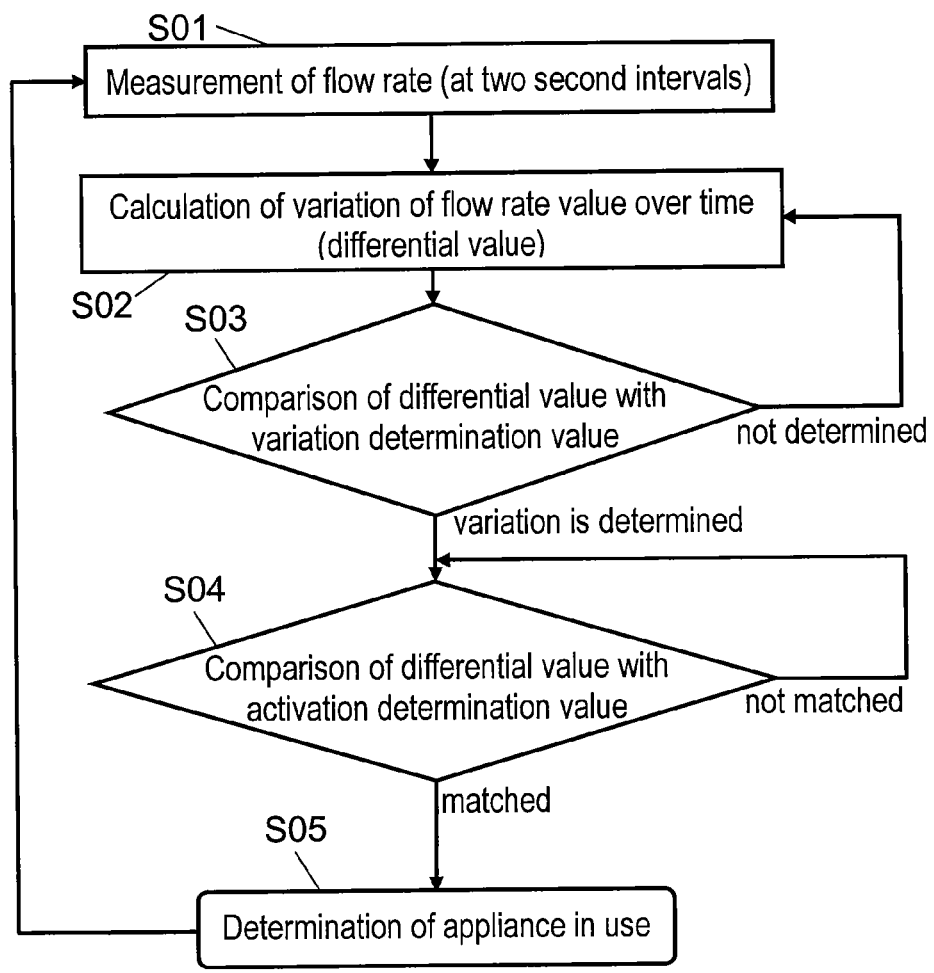
FIG. 3 is a flow chart of identifying activation of a gas appliance in the flow rate measuring device of FIG. 1.

Next, an identifying procedure of the operation of gas appliances is described with reference to FIG. 3. FIG. 3 is a flow chart of identifying the activation in the flow rate measuring device of the exemplary embodiment of the present invention.

Flow rate measuring device 1 measures the gas flow rate at two-second intervals as described above and transmits the data to calculating unit 6 (S01). Calculating unit 6 outputs the differential data of the flow rate every two seconds (S02). This differential data is sequentially transmitted to a comparison determining unit (not shown) disposed in control unit 11, and is compared with the variation determination value registered in appliance registering unit 7 (S03). In this comparison result, when the differential value varies from a substantially zero state beyond the variation determination value, control unit 11 determines that some of gas appliances 31 to 33 have been activated.

Figures 4, 5:
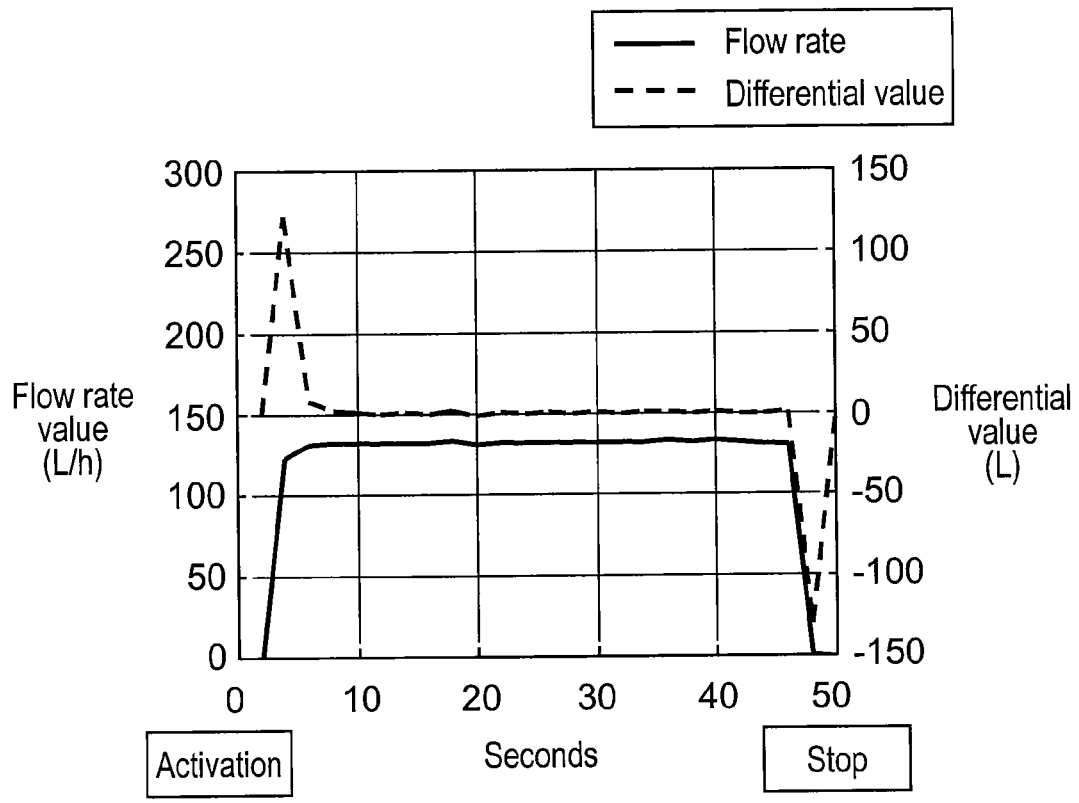
FIG. 4 is a characteristic diagram showing a relation between a measured flow rate value and a differential value in the flow rate measuring device of FIG. 1.
FIG. 5 is a table showing an example of activation determination values in the flow rate measuring device of FIG. 1.

FIG. 4 specifically shows variation of the gas flow rate and variation of the differential value during use of a gas appliance. The solid line represents the gas flow rate value measured by flow rate measurement unit 3, and the dashed line represents the differentiated value during the measurement, namely the differential value every two seconds. The differential value has a peak on the positive side on activation of the gas appliance, and has a peak on the negative side at a stop. As shown in FIG. 3, when the variation of the differential value is a certain variation determination value or more, first appliance identifying unit 8A compares the activation determination value of the gas appliance with the variation of the differential value (S04), and determines that the gas appliance corresponding to the matched activation determination value has been activated (S05).

An example of a reference table of the activation determination values registered in appliance registering unit 7 is shown in FIG. 5. Appliance A is a fan heater, and appliance B is a stove burner, for example. Appliance C is floor heating, and appliance D is a water heater, for example.

Figure 6A:
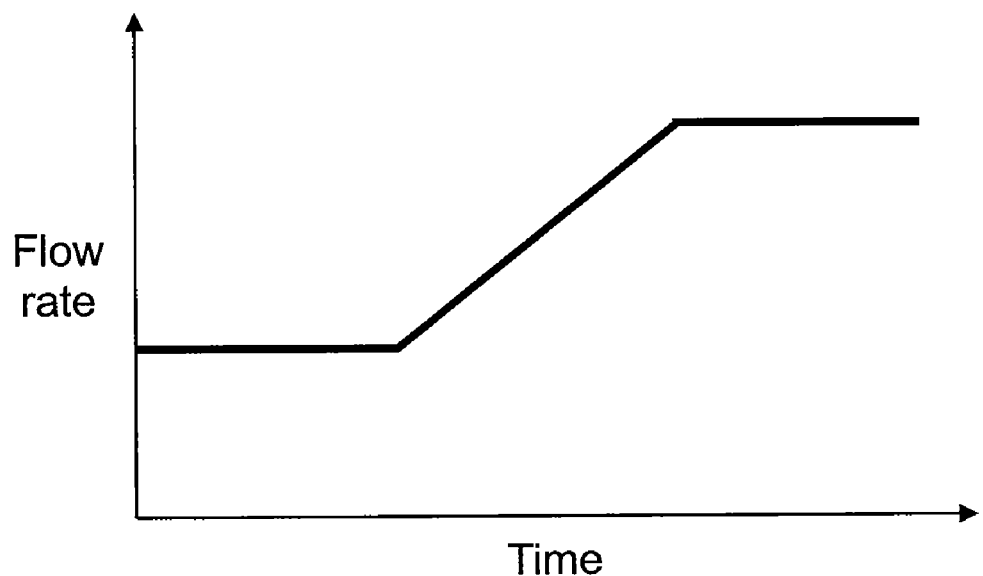
FIG. 6A is a conceptual diagram of a gas flow rate waveform in the flow rate measuring device of FIG. 1.
Figure 6B:
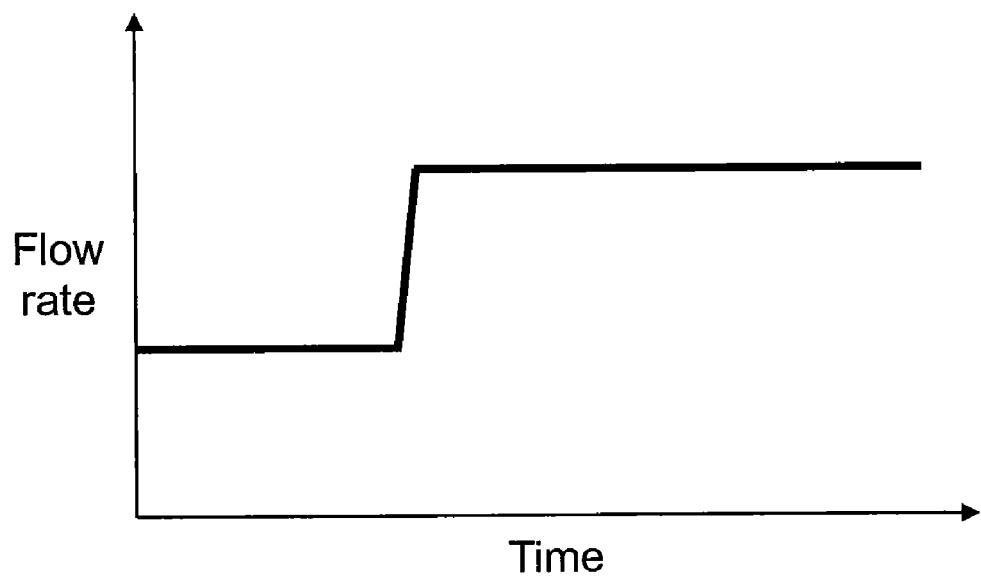
FIG. 6B is a conceptual diagram of another gas flow rate waveform in the flow rate measuring device of FIG. 1.

Next, the determination of state variation following variation of the combustion amount of gas is described. When control operation for varying the combustion amount of gas is performed in a gas appliance, the gas flow rate varies. As shown in FIGS. 6A and 6B, the variation profile has a feature depending on the gas appliance. Especially, the variation time depends on the control method of the gas appliance, so that the gas appliance can be identified by determining the variation time. FIG. 6A shows the variation profile of appliance A in FIG. 5, and FIG. 6B shows the variation profile of appliance B.

Figure 7A:
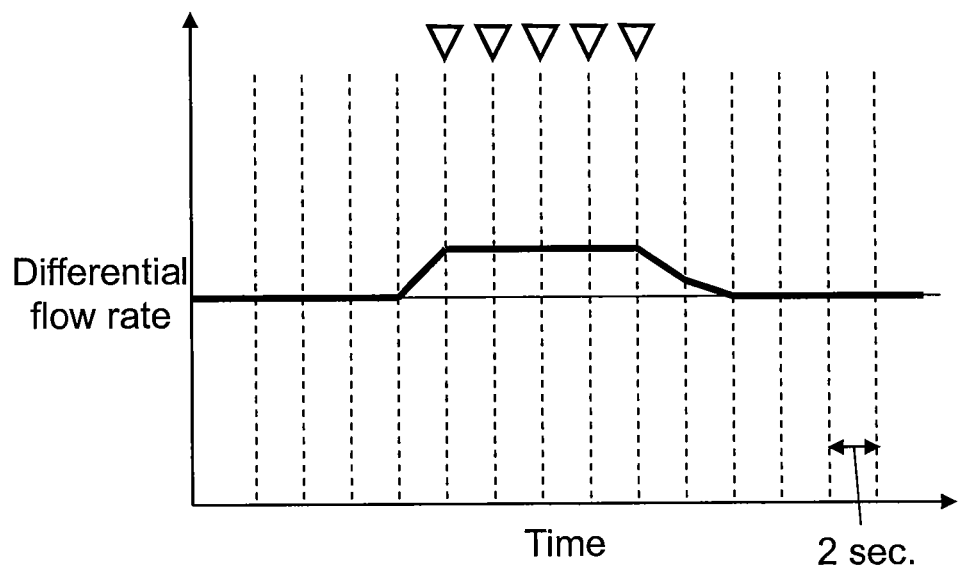
FIG. 7A is a conceptual diagram of a differential waveform of the gas flow rate in the flow rate measuring device of FIG. 1.
Figure 7B:
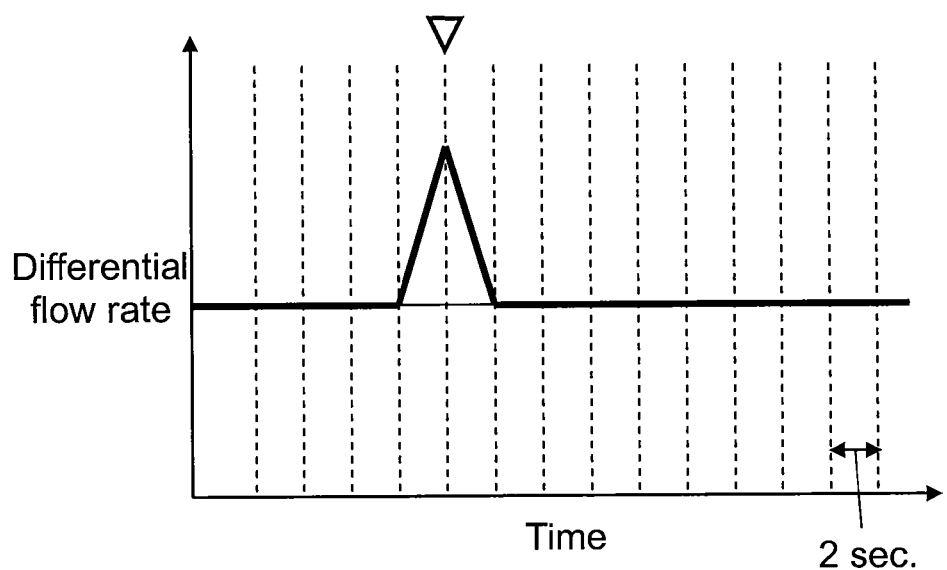
FIG. 7B is a conceptual diagram of another differential waveform of the gas flow rate in the flow rate measuring device of FIG. 1.

FIG. 7A and FIG. 7B show differential values of data of FIG. 6A and FIG. 6B, respectively. Marks V show count occurrence points, and indicate places where the absolute value of the differential value is a predetermined value or more every two seconds. Control unit 11 counts the number of marks V.

Figure 8:
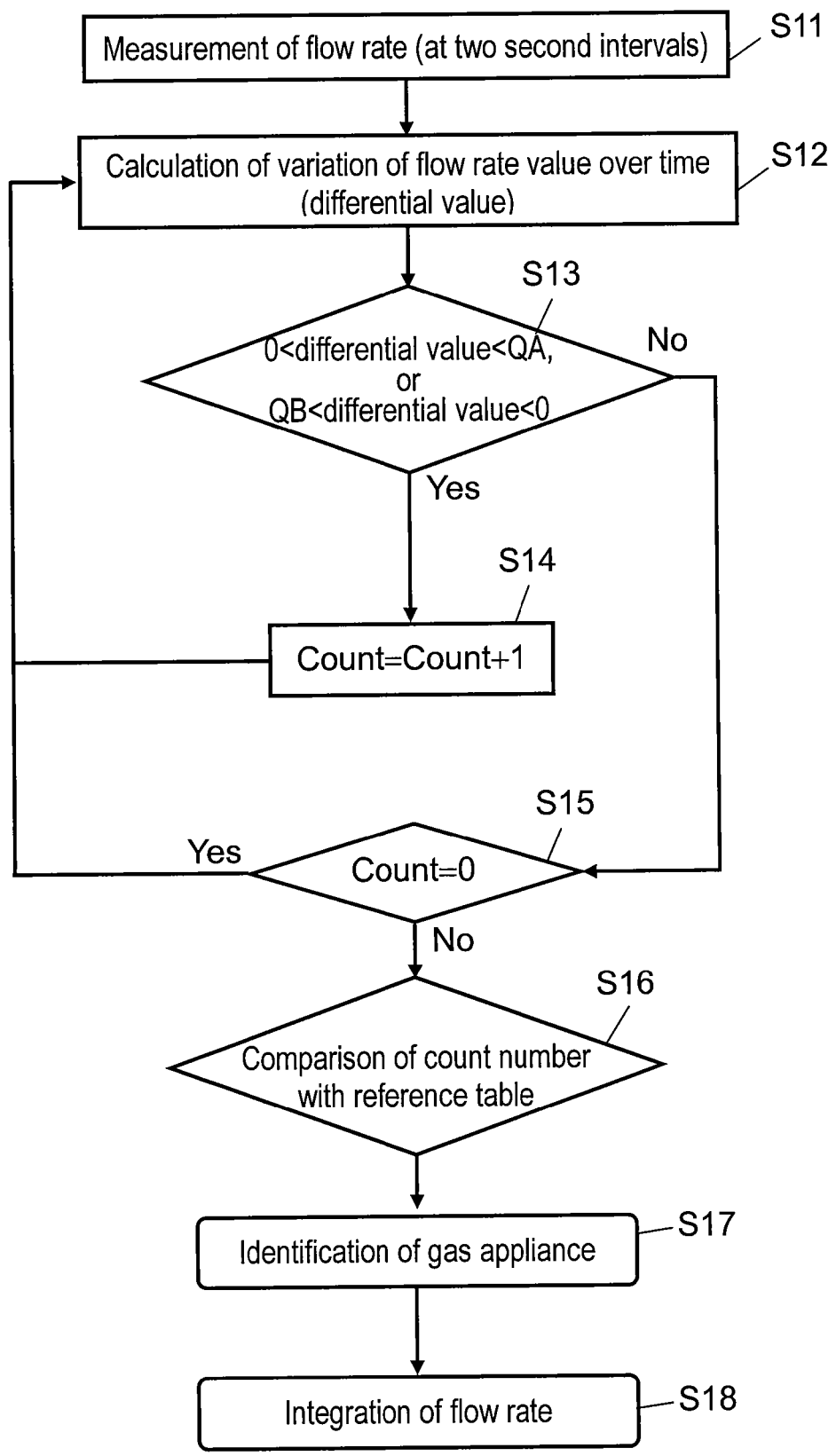
FIG. 8 is a flow chart of identifying flow rate control of a gas appliance in the flow rate measuring device of FIG. 1.

As shown in the flow chart of FIG. 8, the data of the differential values is sequentially transmitted to first appliance identifying unit 8A, and first appliance identifying unit 8A compares the differential data with the determination values registered in appliance registering unit 7 (S13). When a differential value is negative and larger than determination value QB, or is positive and smaller than determination value QA (Yes), a counter (not shown) of control unit 11 operates (S14). The control returns to S12. When the next differential value or later continuously exceeds the determination value, the measurement number of the counter is increased every two seconds.

When the variation of the gas flow rate disappears and the differential value becomes the determination value or less (No), control unit 11 confirms that the count number is not 0 (S15), and outputs the number counted until that time. First appliance identifying unit 8A compares the number with the reference table registered in appliance registering unit 7 (S16), and determines which gas appliance has varied in state (S17). The values shown in FIG. 9, for example, are stored in appliance registering unit 7. QA and QB in FIG. 8 are thresholds for dividing the flow rate variation into activation and stop with respect to control, and the values of them are determined dependently on the used appliance.

As described above, once the gas appliances are confirmed to be activated, even when flow rate variation occurs, one of the gas appliances having undergone the flow rate variation can be identified. In addition, the flow rate variation amounts before and after the flow rate variation can be determined. Appliance flow rate integrating unit 9 therefore adds or subtracts the determined varying flow rate from the gas flow rate of the gas appliance before the variation determined by calculating unit 6, and always fixes the flow rate of the specific appliance (S18). Therefore, even when a plurality of gas appliances are in use, the gas amount used by each gas appliance can be accurately determined. In other words, the gas amount used by each gas appliance is determined by adding up the differential values calculated by calculating unit 6 based on the instantaneous used flow rate value.

Figure 10:
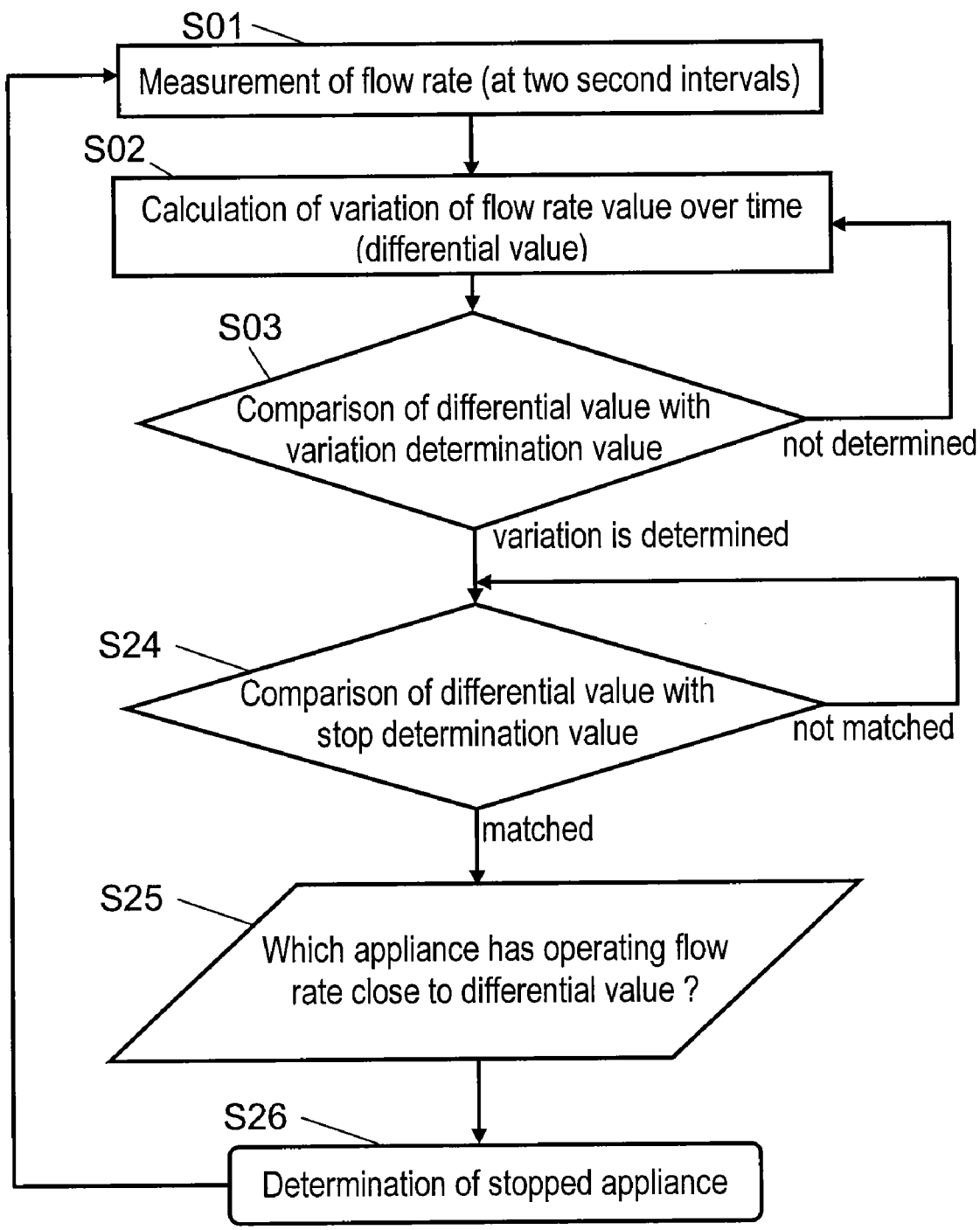
FIG. 10 is a flow chart of stop identification of a gas appliance in the flow rate measuring device of FIG. 1.

Next, identification at a stop is described with reference to the flowchart of FIG. 10. When a differential value is negative and is equal to a reference value QB for stop determination or smaller, after step S03, second appliance identifying unit 8B compares the stop determination value of the gas appliance with the differential value (S24). Second appliance identifying unit 8B sets, as a stop candidate, the gas appliance that is determined to have operated at the flow rate close to the absolute value of the differential value (S25), and determines that the appliance corresponding to the stop determination value has stopped (S26). Such a stop determination value is stored in appliance registering unit 7.

Figure 11:
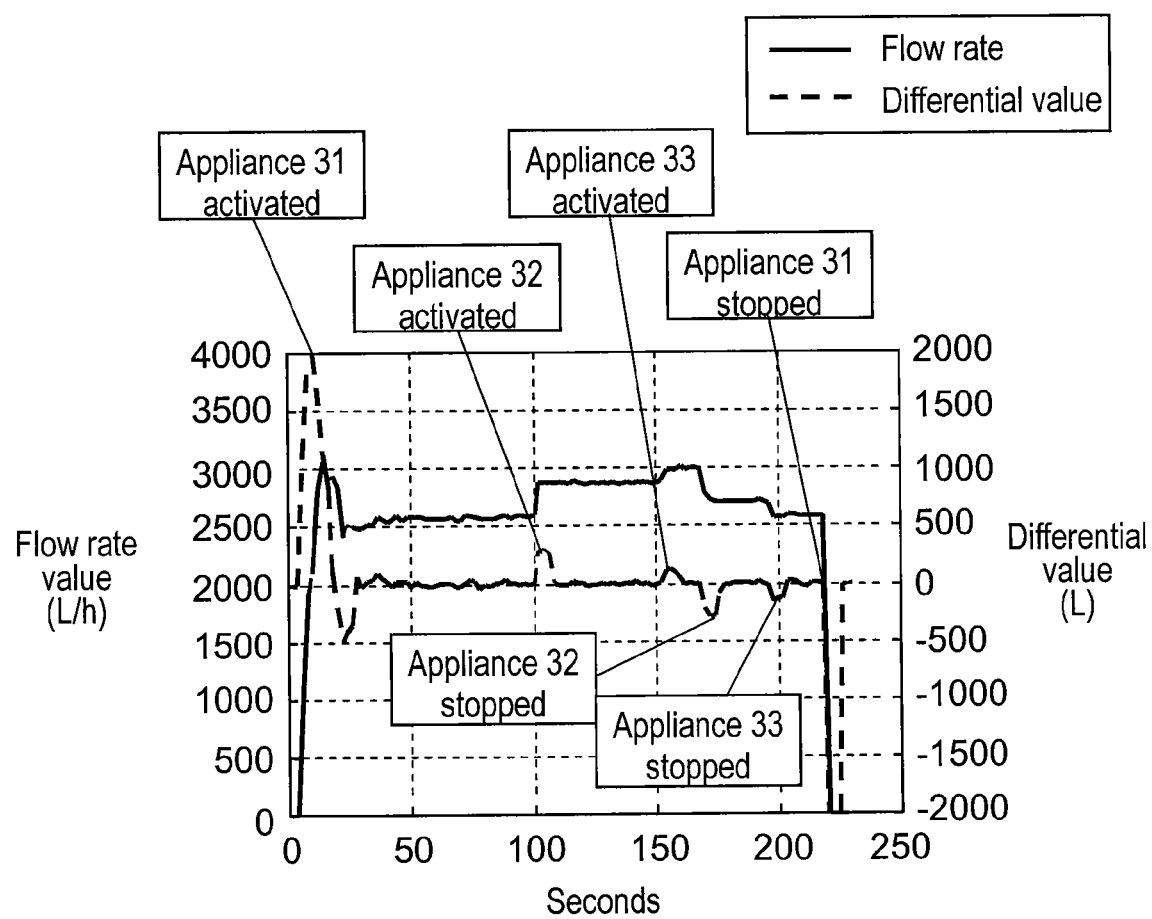
FIG. 11 is a characteristic diagram showing a relation between a measured flow rate value and a differential value in the flow rate measuring device of FIG. 1.

For example, the graph of FIG. 11 shows the flow rate value and differential value when appliances 31, 32 and 33 are used simultaneously. Even from such a complicated flow rate variation profile, first appliance identifying unit 8A and second appliance identifying unit 8B can read the variation when appliances 31, 32 and 33 are activated and stopped. First appliance identifying unit 8A and second appliance identifying unit 8B may be unified.

Control unit 11 displays the information of the identification result on display unit 4. Control unit 11 may transmit the information to an external terminal (not shown) for display. Transmission of information to the external terminal can be performed using any of wired and wireless communications.

Figure 12:
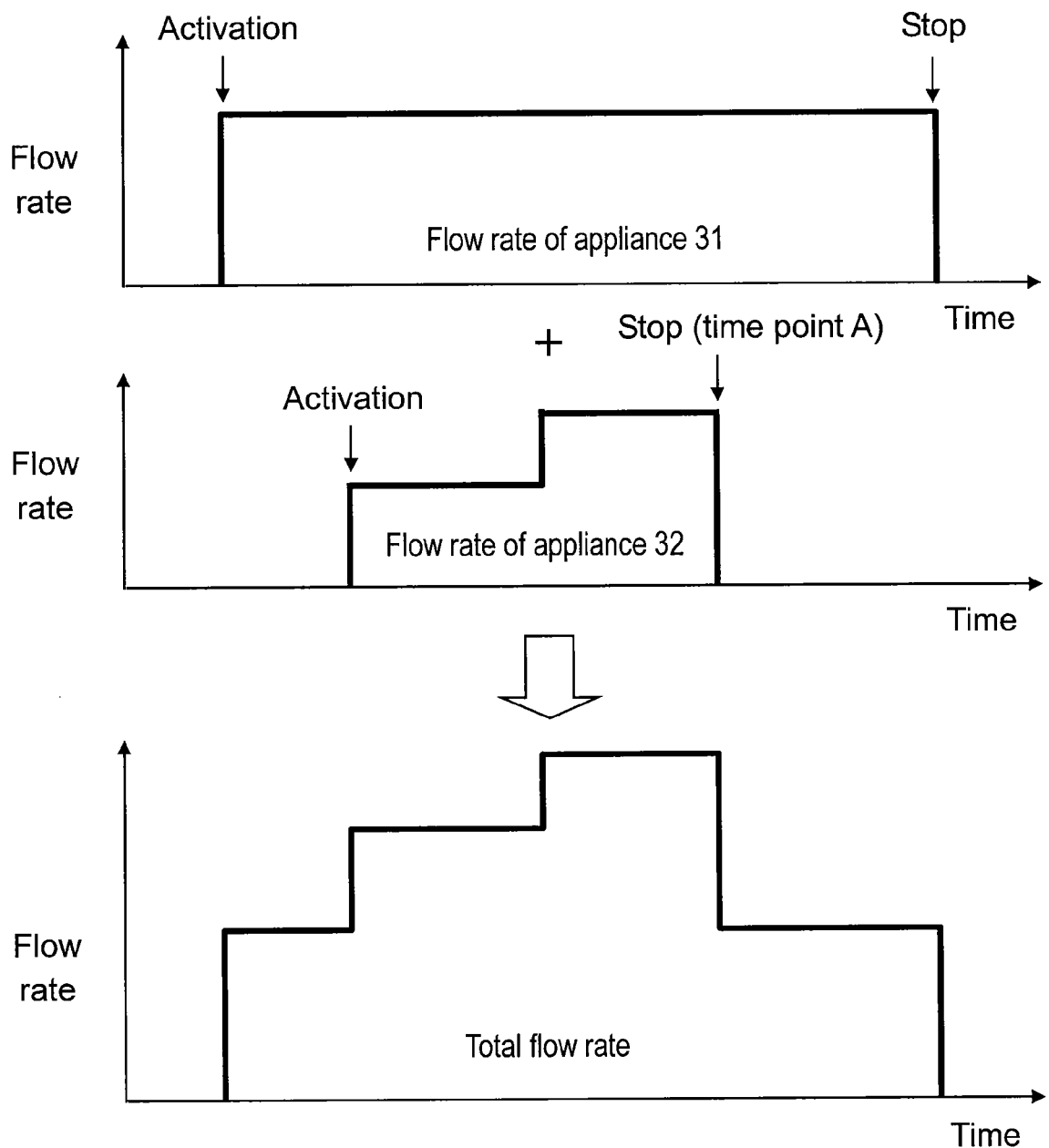
FIG. 12 is a flow rate conceptual diagram in operation of a plurality of appliances in the flow rate measuring device of FIG. 1.

When the stop determination values of two gas appliances are close to each other, however, second appliance identifying unit 8B can incorrectly determine which gas appliance has stopped. FIG. 12 is a conceptual diagram of the flow rate variation measured when two gas appliances operate. The description of the operation for the activation determination of each gas appliance is as mentioned above, and hence is omitted.

Figure 13:
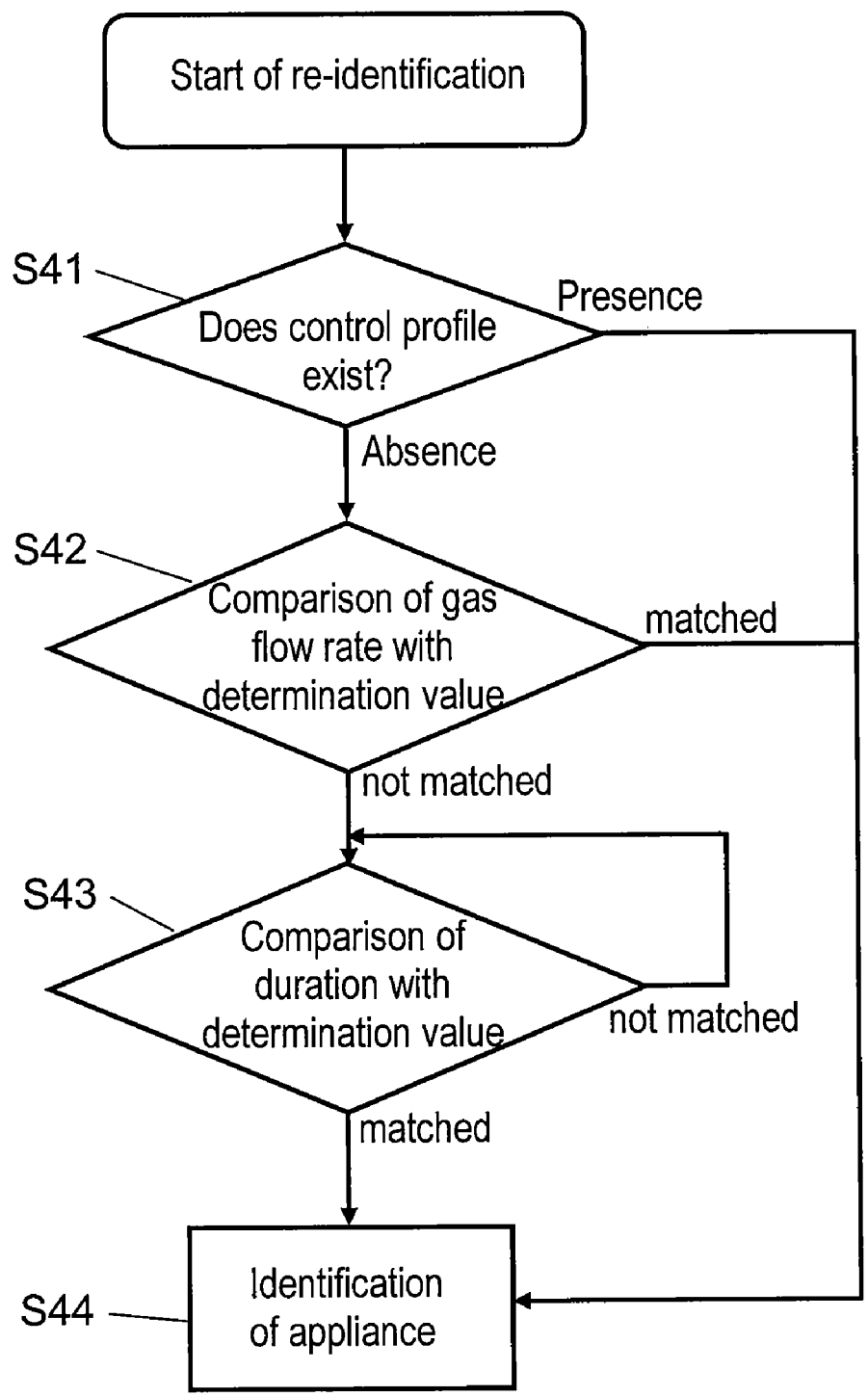
FIG. 13 is a flow chart for identifying a gas appliance in continuous use in the flow rate measuring device of FIG. 1.

When two gas appliances 31 and 32 operate and then gas appliance 32 stops as shown in FIG. 12, the flow rates of gas appliances 31 and 32 during operation are substantially the same at time point A and it can be difficult to determine which appliance has stopped. In such a case, second appliance identifying unit 8B identifies the gas appliance having stopped in a method different from the above-mentioned method. One example of the method is described using the flowchart of FIG. 13.

Figure 14:
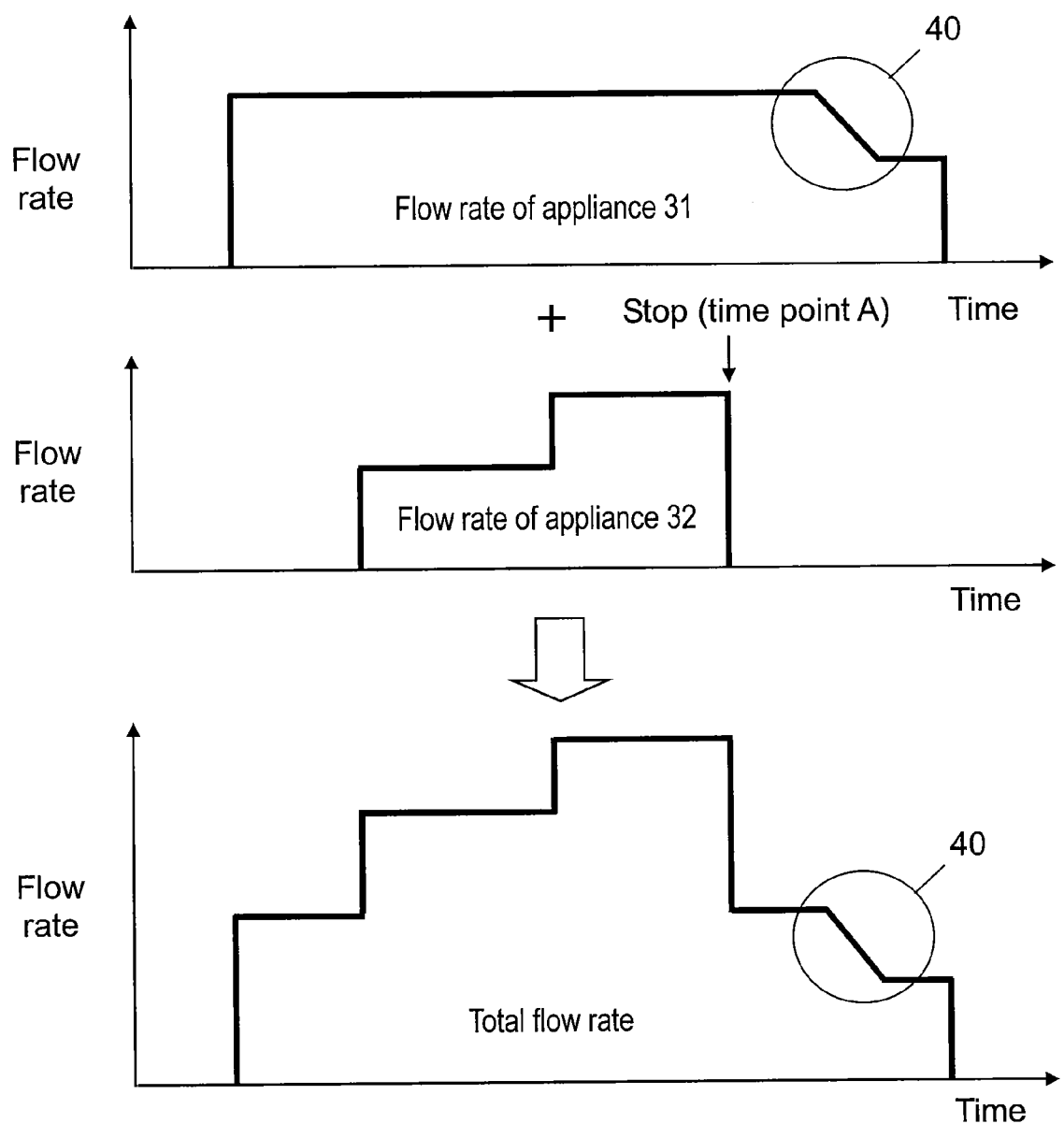
FIG. 14 is a conceptual diagram of a flow rate waveform showing an example of identifying a gas appliance in the flow rate measuring device of FIG. 1.

Second appliance identifying unit 8B compares the gas flow rate variation profile after time point A with the gas flow rate variation profile at the stop stored in appliance registering unit 7. First, second appliance identifying unit 8B investigates the existence of the gas flow rate profile based on the control stored in appliance registering unit 7, as described in control determination (S41). A specific example is described using FIG. 14. In FIG. 14, appliance 31 is a fan heater, and appliance 32 is a stove burner. The gas flow rate used in appliance 31, which is the fan heater, smoothly varies like part 40. When the gas flow rate profile responsive to the combustion control of gas specific to the gas appliance appears, second appliance identifying unit 8B determines that the gas appliance having the gas flow rate profile operates. Specifically, the control registration value of the gas flow rate for each gas appliance is previously stored in appliance registering unit 7, and second appliance identifying unit 8B compares the control registration value with the actual gas flow rate variation.

Next, when the gas flow rate profile based on such control does not appear, second appliance identifying unit 8B compares the gas flow rate at that time with the used flow rate range of each gas appliance stored in appliance registering unit 7 (S42). Second appliance identifying unit 8B determines that the gas appliance corresponding to the matched flow rate range used is operating. The reference table of FIG. 15 is stored in appliance registering unit 7. The used flow rate range is determined dependently on the type of the gas appliance.

For example, also when the measured flow rate by flow rate measurement unit 3 is 30 L/h, the gas appliance can be identified because this flow rate corresponds to only use of a single stove burner.

Figure 17:
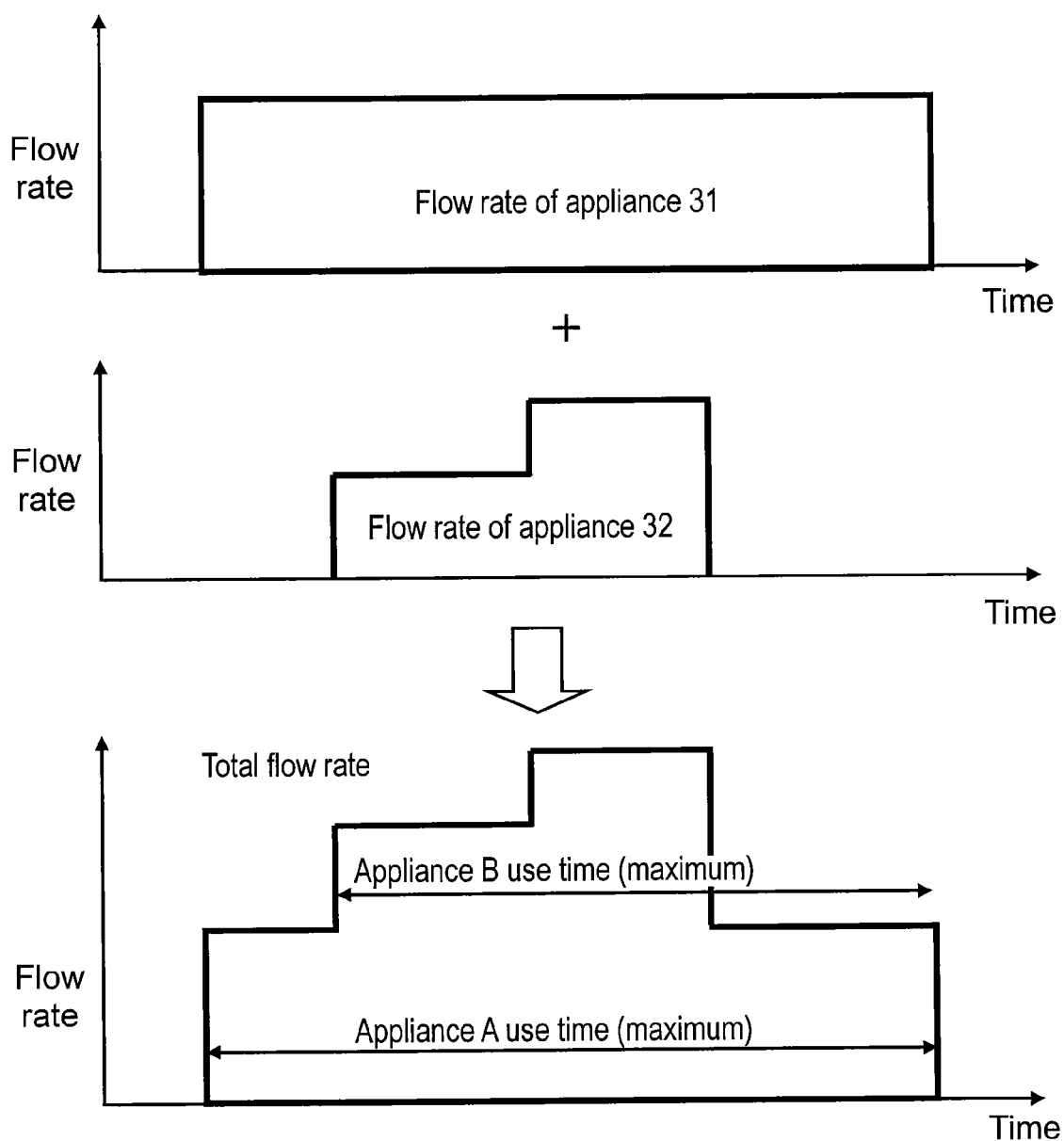
FIG. 17 is a conceptual diagram of a flow rate waveform showing another example of identifying a gas appliance in the flow rate measuring device of FIG. 1.

When the measured flow rate by flow rate measurement unit 3 is 100 L/h, however, second appliance identifying unit 8B cannot determine whether the gas appliance during operation is appliance A or appliance B. In this case, second appliance identifying unit 8B compares the table shown in FIG. 16, which includes used flow rate ranges and continuous use times of the gas appliances, with the time from the activation to the stop of each gas appliance shown in FIG. 17 (S43). For measuring the time from the activation to the stop of each gas appliance, preferably, clocking unit 17 of FIG. 1 is disposed. After first appliance identifying unit 8A determines that each gas appliance is activated, clocking unit 17 measures the use duration of each gas appliance. Second appliance identifying unit 8B identifies the gas appliance in use based on the use duration measured by clocking unit 17. Thus, the gas use duration can be employed as the gas flow rate variation profile. Even if stop determination is incorrect, the stop determination can be corrected and the flow rate calculation accuracy of the gas appliance can be improved.

In this configuration, second appliance identifying unit 8B compares the gas flow rate variation profile after the detection of a stop of a gas appliance with the gas flow rate variation profile based on the control specific to the gas appliance stored in appliance registering unit 7. Second appliance identifying unit 8B then identifies whether the gas appliance in use is appliance 31 or appliance 32. In other words, the control profile shown in FIG. 14 and the reference tables shown in FIGS. 15 and 16 are gas flow rate variation profiles (control registration value) based on the control specific to the gas appliance stored in appliance registering unit 7. The above-mentioned identifying method is one example, and the sequence may be changed, for example. Only one identifying process may be executed.

In other words, appliance registering unit 7 stores at least one of the control registration value of the gas flow rate and the used flow rate range of each gas appliance, as the gas flow rate variation profile. Second appliance identifying unit 8B identifies the gas appliance in use by using at least one of the control registration value of the gas flow rate and the used flow rate range. As the gas flow rate variation profile, specifically, the above-mentioned determination reference can be used. Even if stop determination is incorrect, the stop determination can be corrected and the flow rate calculation accuracy of the gas appliance can be improved.

In this configuration, calculating unit 6 determines the differential value based on the variation of the gas flow rate measured by flow rate measurement unit 3, and determining unit 16 detects a stop of a gas appliance based on the calculated differential value. Second appliance identifying unit 8B then compares the gas flow rate variation profile after the detection of the stop by determining unit 16 with the gas flow rate variation profile based on the control specific to the gas appliance stored in the appliance registering unit. However, the present invention is not limited to this configuration.

As shown in FIG. 1, flow rate storage unit 10 may be disposed, and flow rate storage unit 10 may store the total gas flow rate variation profile. In this case, when flow rate measurement unit 3 detects that gas flow rate has run out, second appliance identifying unit 8B compares the gas flow rate variation profile stored in flow rate storage unit 10 before the gas flow rate runs out with the gas flow rate variation profile based on the control stored in appliance registering unit 7. Thus, the gas appliance having stopped later is identified. Of the gas appliances determined to be activated by first appliance identifying unit 8A, the gas appliance having stopped on ahead is identified. For identifying the activation, calculating unit 6 determines the differential value of the gas flow rate, and determining unit 16 detects activation of some gas appliance. However, this constitution is not essential. When the flow rate increases significantly as shown in FIG. 11, the activation can be determined.

Also in this configuration, when only one gas appliance is still in use, the gas appliance in use is identified based on the gas flow rate variation profile, and the gas appliance that has stopped before it is identified. Therefore, the use or stop of each gas appliance can be certainly determined even using a stop determination part that can cause incorrect determination.

However, it is preferable that calculating unit 6 determines the differential value of the gas flow rate, and determining unit 16 is disposed and detects activation of any gas appliance. This configuration allows determining unit 16 to determine a stop of some gas appliance. Therefore, the use or stop of each gas appliance can be more accurately determined. When determining unit 16 determines that one of the gas appliances has stopped, flow rate storage unit 10 may store the total gas flow rate variation profile after that time. This configuration allows determining unit 16 to determine a stop of some gas appliance. Therefore, flow rate storage unit 10 is simply required to store the total gas flow rate variation profile before and after the determination. In other words, flow rate storage unit 10 is not always required to store the total gas flow rate variation profile until the gas flow rate runs out, and therefore the storage capacity of flow rate storage unit 10 can be reduced.

Next, a method of fixing the gas amount (integrated flow rate) used by each gas appliance when identification of the gas appliance at a stop is difficult as discussed above is described.

Figure 18:
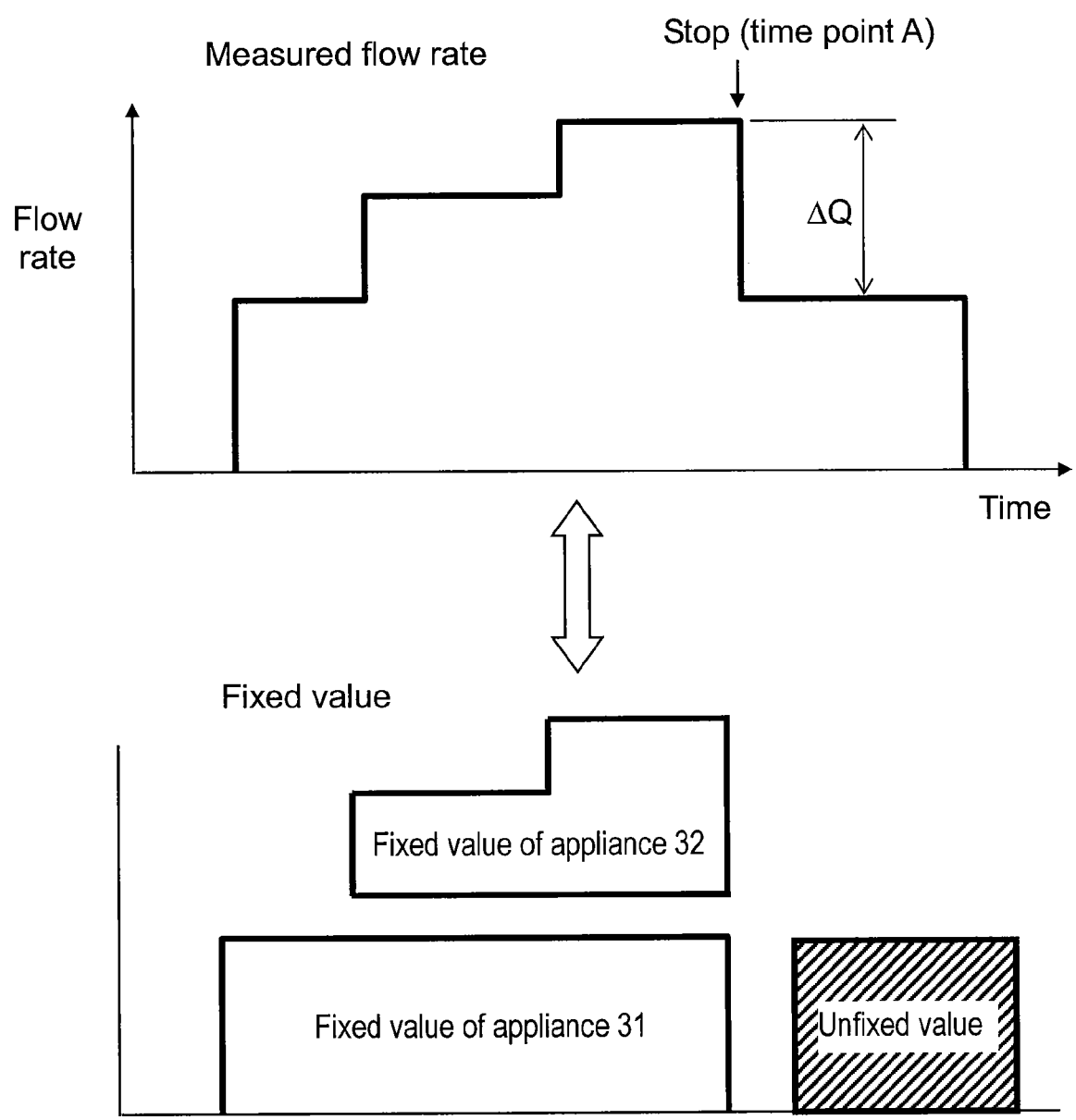
FIG. 18 is a conceptual diagram of flow rate zones in operation of a plurality of appliances in the flow rate measuring device of FIG. 1.

When the stop determination of a gas appliance is incorrect, the gas flow used in each gas appliance is incorrectly determined. In the present embodiment, therefore, the integrated flow rates of all operating gas appliances are temporarily fixed at time point A when one gas appliance has stopped as shown in FIG. 18. When flow rate is continuously measured after time point A, some gas appliance is in operation and hence the integrated flow rate is set as an unfixed value. Then, which gas appliance corresponds to the gas flow rate of the unfixed value is determined later by other logic as discussed above.

In this method, the integrated flow rate used by each gas appliance can be ensured at least until time point A. The integrated flow rate of the gas appliance used after time point A can be also fixed by second appliance identifying unit 8B. Therefore, the incorrect identification of a gas appliance due to a stop is prevented from reducing the determining accuracy of the used integrated flow rate.

Figure 19:
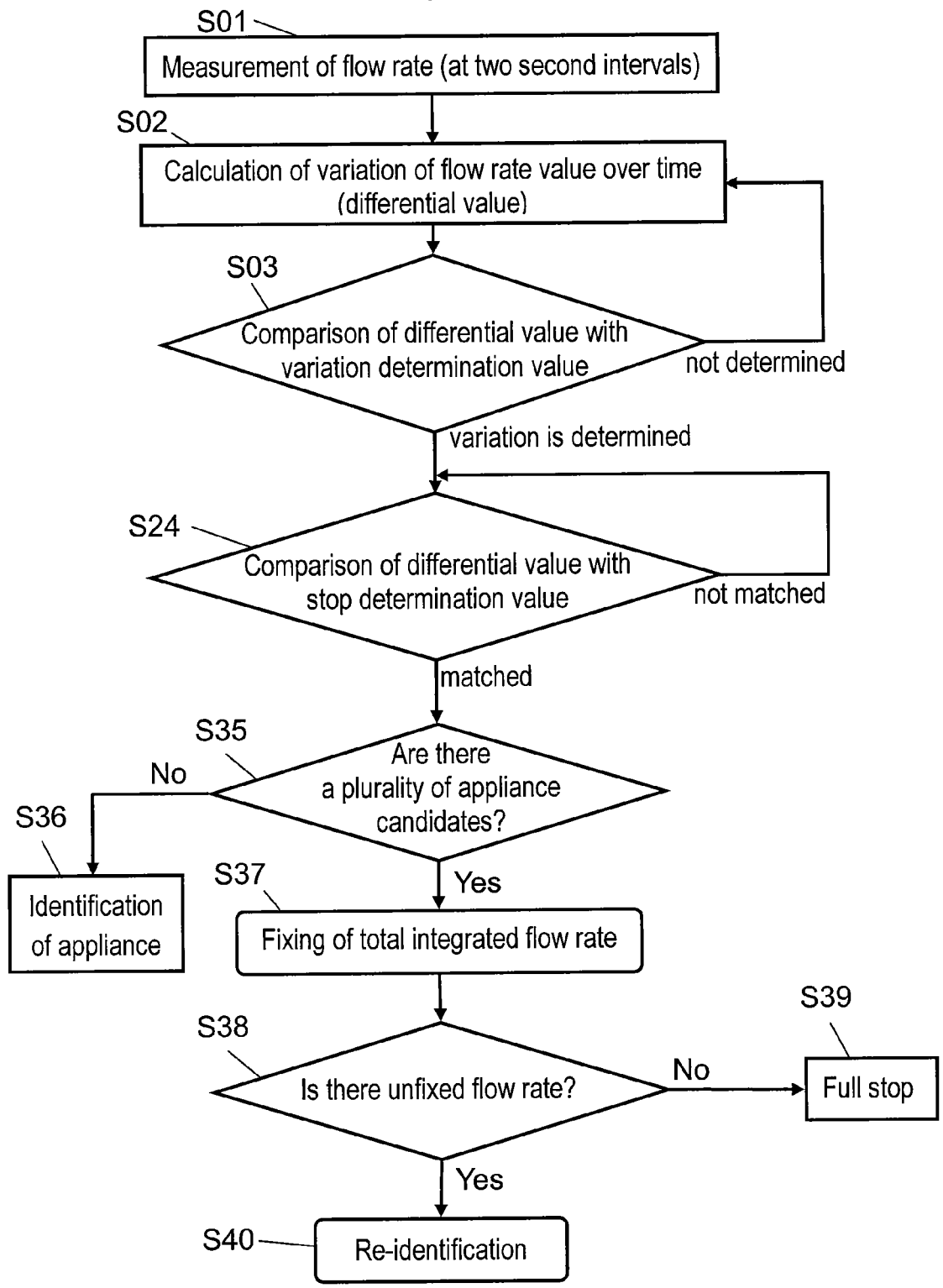
FIG. 19 is a flow chart of calculating an integrated flow rate at a stop of a plurality of appliances in the flow rate measuring device of FIG. 1.
Figure 20:
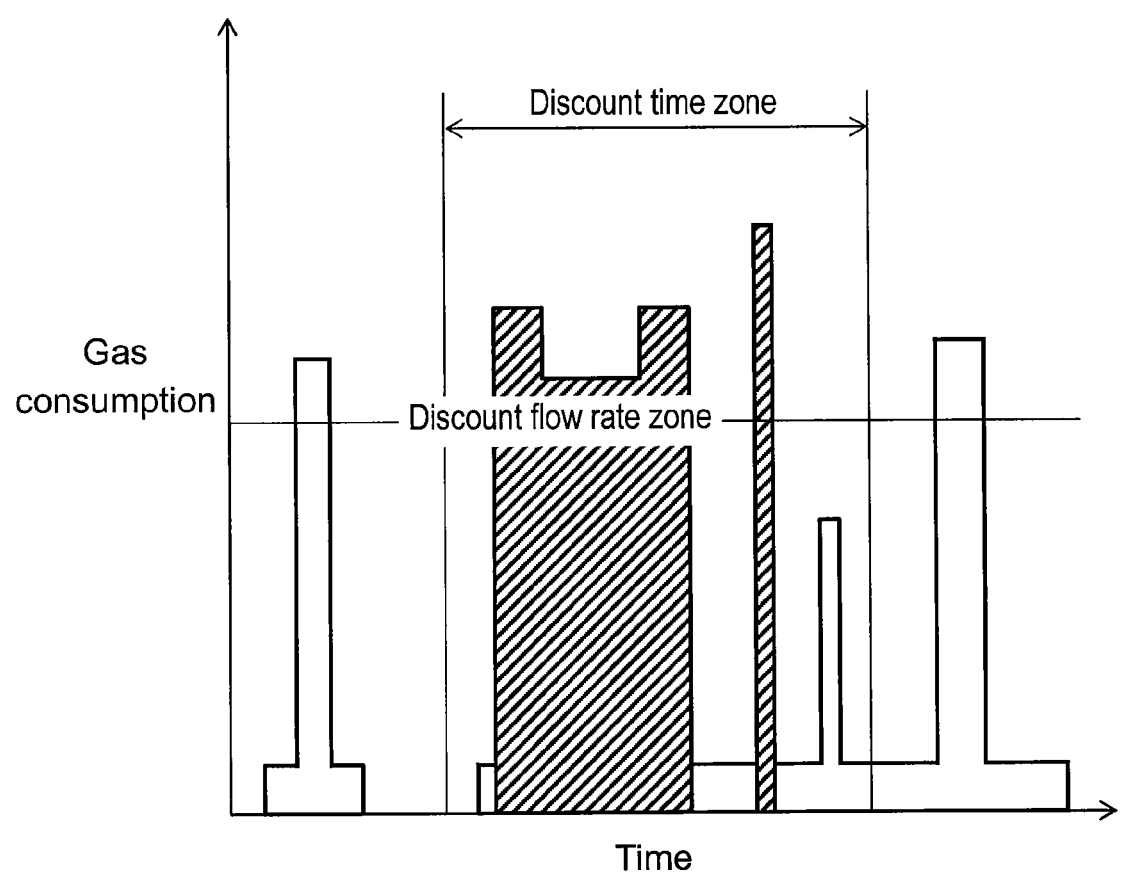
FIG. 20 is a conceptual diagram showing an integrated flow rate identifying method of each gas appliance in a conventional flow rate measuring device.
Figure 21:
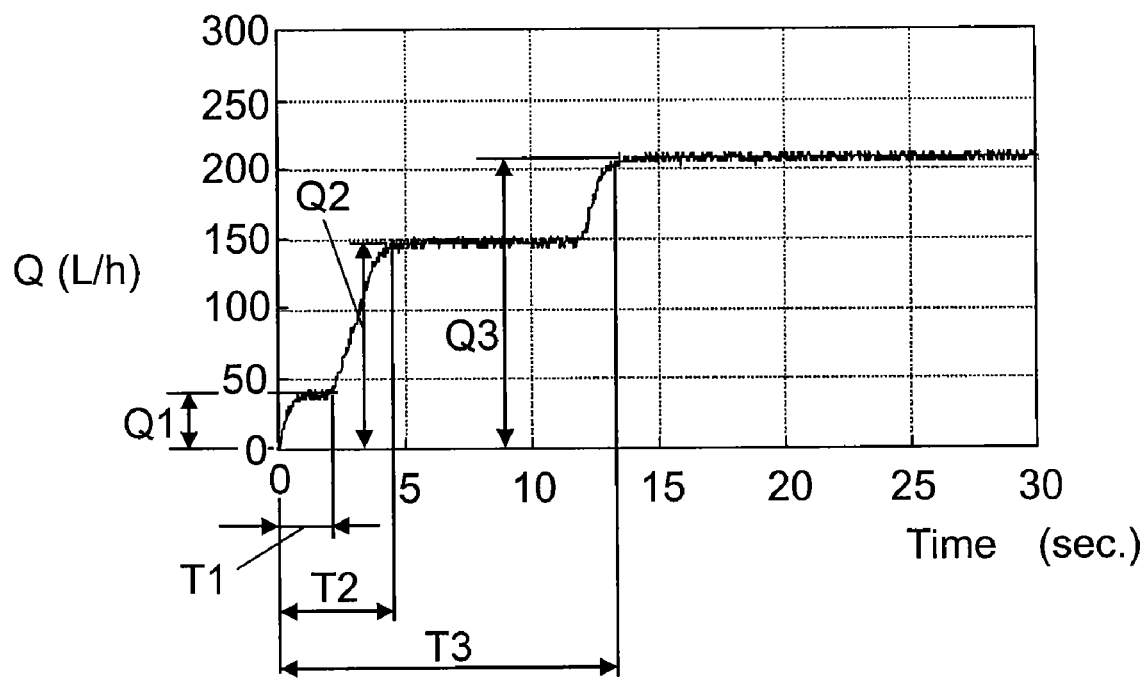
FIG. 21 is a diagram showing an example of data configuration in the integrated flow rate identifying method of each gas appliance in the conventional flow rate measuring device.

Next, the fixing method of the unfixed flow rate is described with reference to the flowchart of FIG. 19. When the flow rate varies during operation of a plurality of gas appliances, the differential value calculated by calculating unit 6 matches with the determination value of the stop, and the stop of some gas appliance is determined, a candidate of the stop gas appliance is firstly determined. In order to perform the determination, as discussed above, second appliance identifying unit 8B compares the magnitude of the occurring differential value with the stop determination value of each gas appliance (S24). When there are not a plurality of appliance candidates at this time, the appliance is identified and the control is finished (S36). When there are a plurality of appliance candidates, it is determined that the gas appliance corresponding to the stop determination value close to the magnitude of the differential value stops, and the other gas appliances are considered to be continuously used. The flow rates of these gas appliances are continuously added (integrated) by appliance flow rate integrating unit 9. The flow rate of the stop gas appliance is not integrated after the stop time.

When there are two stop determination values substantially the same as the magnitude of the differential value at the stop, it is difficult to determine which gas appliance is set as the stop candidate, only based on the differential value. Therefore, at the time when determining unit 16 determines the stop of one of the gas appliances, the integrated flow rates of the two gas appliances until that time are temporarily fixed (fixed value). Fixed flow rate storage unit 10A stores the integrated flow rate of each gas appliance as the fixed value (S37). When there is no unfixed value, all the appliances are determined to have stopped (S39).

At this time, when there is one unfixed flow rate that is not determined to correspond to which gas appliance, unfixed flow rate storage unit 10B stores, the integrated value as an unfixed value until the flow rate can be determined to correspond to which gas appliance. Then, the re-identification for identifying a gas appliance that uses the gas amount corresponding to the unfixed value is started. In other words, second appliance identifying unit 8B identifies the gas appliance in use in the above-mentioned manner, namely identifies the gas appliance corresponding to the unfixed value (S40).

Fixed flow rate storage unit 10A has storage regions as many as gas appliances connected to flow channel 15. Each storage region stores the fixed value belonging to each gas appliance. The unfixed value is held in unfixed flow rate storage unit 10B. After the gas appliance to which the unfixed value belongs is identified by the re-identification, control unit 11 adds the unfixed value to the fixed value of the gas appliance that is previously fixed by fixed flow rate storage unit 10A. In other words, the contents of fixed flow rate storage unit 10A of flow rate storage unit 10 are rewritten.

As discussed above, when a plurality of gas appliances are simultaneously used and then determining unit 16 determines a stop of one of the gas appliances, fixed flow rate storage unit 10A stores the integrated flow rate of each of the gas appliances determined to be activated by first appliance identifying unit 8A, as a fixed value. When the value measured by flow rate measurement unit 3 is a predetermined flow rate or more continuously since the stop determination, unfixed flow rate storage unit 10B stores the integrated flow rate value as an unfixed value. When flow rate measurement unit 3 measures an unfixed value, second appliance identifying unit 8B identifies the gas appliance corresponding to the unfixed value. Thus, the flow rate used by each gas appliance until the stop determination is temporarily stored as a fixed value. Therefore, the measuring accuracy of the integrated gas flow rate of each gas appliance is improved.

When the unfixed value is stored in unfixed flow rate storage unit 10B and second appliance identifying unit 8B identifies the gas appliance in use, control unit 11 adds the unfixed value to the integrated flow rate of the gas appliance in use in fixed flow rate storage unit 10A. When one of the gas appliances is determined to stop and the gas appliance is determined to be continuously used since then, appliance flow rate integrating unit 9 integrates the used flow rate again. When the gas appliance in use is identified again, control unit 11 adds the measured flow rate to the fixed flow rate again. Since the used flow rates determined in the stop determination part where incorrect determination can occur are sequentially fixed, the measuring accuracy of the integrated gas flow rate of each gas appliance is increased. Since the flow rate value that cannot be determined due to incorrect stop determination can be also stored and remained, the reliability as a system can be improved.

Thus, a gas amount used in each appliance and each function can be calculated in the present embodiment. When a fee calculating unit (not shown) for individual flow rate is disposed, the individual fee for the gas flow rate used in each appliance and each function can be billed, thereby allowing arbitrary fee for each appliance and each function to be calculated dependently on the setting by a gas utility.

As one new gas billing scheme as an example of provided services, it is considered that a discount system is applied only to heating appliances. Such a system makes consumers feel inexpensiveness of gas fee, the heating appliances are used for a long time, and the gas utility can expand the gas sales and increase the appliance sales. In other words, when flow rate measuring device 1 of the present embodiment is connected to gas supply pipe 20 to construct a gas supply system, a new fee menu or the like prepared by the gas utility can be used, and the gas sales and the gas appliance sales can be increased.

It is preferable that second appliance identifying unit 8B identifies the gas appliance corresponding to an unfixed value while flow rate of a predetermined value or more is stored in unfixed flow rate storage unit 10B. Thanks to this method, it can be determined that the unfixed value is caused not by minor gas leak or noise but by use of a gas appliance. Therefore, second appliance identifying unit 8B can be prevented from incorrectly identifying a gas appliance.

For the activation determination, the count number of the difference described using FIG. 6 and FIG. 7 may be employed.

As described above, a flow rate measuring device of the present invention allows the determining accuracy of the flow rate to be maximized even when at least one of a plurality of gas appliances stops during operation and the determination of the stopping gas appliance is difficult. Therefore, the flow rate measuring device can be employed for a security function or various services using appliance identification information.

What is claimed is:

1. A flow rate measuring device comprising:
   a flow rate measurement unit configured to measure a gas flow rate flowing in a flow channel;
   an appliance registering unit configured to store at least first gas flow rate variation profiles exhibited by a first gas appliance and a second gas appliance, respectively, upon activation thereof, which are coupled to the flow channel, and second gas flow rate variation profiles exhibited by the first gas appliance and the second gas appliance, respectively, under control peculiar thereto;
   a calculating unit configured to determine a differential value of flow rate value data outputted from the flow rate measurement unit;
   a determining unit configured to compare the differential value determined by the calculating unit with a preset variation determination value to thereby determine that a state of at least one of the first gas appliance and the second gas appliance has varied when the differential value is larger than the preset variation determination value;
   a first appliance identifying unit configured to compare a gas flow rate variation profile measured by the flow rate measurement unit with the first gas flow rate variation profiles stored in the appliance registering unit to thereby identify the first gas appliance and the second gas appliance that are activated; and a second appliance identifying unit, wherein when the calculating unit calculates a differential value based on variation of the gas flow rate measured by the flow rate measurement unit and the determining unit detects a stop of one of the first gas appliance and the second gas appliance based on the calculated differential value, the second appliance identifying unit compares a gas flow rate variation profile exhibited after the stop is detected with the second gas flow rate variation profiles stored in the appliance registering unit to thereby identify a gas appliance in use and a gas appliance having stopped of the gas appliances that are determined to be activated by the first appliance identifying unit.

2. The flow rate measuring device according to claim 1, wherein the appliance registering unit stores, as gas flow rate variation profiles, at least one of control registration values of gas flow rate and used flow rate ranges, of the respective first and second gas appliances, and the second appliance identifying unit identifies the gas appliance in use by using at least one of the control registration values of gas flow rate and the used flow rate ranges.

3. The flow rate measuring device according to claim 1, further comprising:

a clocking unit configured to measure a use duration of each of the first gas appliance and the second gas appliance after the first appliance identifying unit determines that the first gas appliance and the second gas appliance are activated, wherein the second appliance identifying unit identifies the gas appliance in use based on the use duration measured by the clocking unit.

4. The flow rate measuring device according to claim 1, further comprising:

an appliance flow rate integrating unit configured to determine integrated flow rates used by the respective first and second gas appliances identified by the first appliance identifying unit; and a flow rate storage unit configured to store the integrated flow rates determined by the appliance flow rate integrating unit, wherein the flow rate storage unit includes:

a fixed flow rate storage unit configured to store, as fixed values, integrated flow rate of the respective first and second gas appliances determined to be activated by the appliance flow rate integrating unit, when the first and second gas appliances are used simultaneously and then the determining unit determines a stop of one of the first and second gas appliances; and an unfixed flow rate storage unit configured to store an integrated flow rate value as an unfixed value when a value measured by the flow rate measurement unit is a predetermined flow rate or more continuously after the stop one of the first and second gas appliances is determined, wherein the second appliance identifying unit identifies a gas appliance corresponding to the unfixed value when the flow rate measurement unit measures the unfixed value.

5. The flow rate measuring device according to claim 4, wherein when a value of a predetermined amount or more is stored in the unfixed flow rate storage unit, the second appliance identifying unit identifies a gas appliance corresponding to the unfixed value.

6. The flow rate measuring device according to claim 4, further comprising a control unit, wherein when an unfixed value is stored in the unfixed flow rate storage unit and the second appliance identifying unit identifies a gas appliance in use, the control unit adds the unfixed value to an integrated flow rate of the gas appliance in use in the fixed flow rate storage unit.

7. The flow rate measuring device according to claim 1, wherein the flow rate measurement unit includes an ultrasonic flow meter.

8. A gas supply system comprising:

a gas supply pipe; and the flow rate measuring device according to claim 1 coupled to the gas supply pipe.

9. A flow rate measuring device comprising:

a flow rate measurement unit configured to measure a gas flow rate flowing in a flow channel;

an appliance registering unit configured to store at least first gas flow rate variation profiles exhibited by a first gas appliance and a second gas appliance, respectively, upon activation thereof which are coupled to the flow channel, and second gas flow rate variation profiles exhibited by the first gas appliance and the second gas appliance, respectively, under control peculiar thereto;

a first appliance identifying unit configured to compare a gas flow rate variation profile measured by the flow rate measurement unit with the first gas flow rate variation profiles stored in the appliance registering unit to thereby identify the first gas appliance and the second gas appliance that are activated;

a flow rate storage unit configured to store a total gas flow rate variation profile; and a second appliance identifying unit, wherein when the flow rate measurement unit detects that the gas flow ceases, the second appliance identifying unit compares the total gas flow rate variation profile stored in the flow rate storage unit before the gas flow ceases with the second gas flow rate variation profiles stored in the appliance registering unit to thereby identify a gas appliance having stopped second and identifies a gas appliance having stopped first of gas appliances that are determined to be activated by the first appliance identifying unit.

10. The flow rate measuring device according to claim 9, further comprising:

a calculating unit configured to determine a differential value of flow rate value data output from the flow rate measurement unit; and a determining unit configured to compare the differential value determined by the calculating unit with a preset variation determination value to thereby determine that a state of at least one of the first gas appliance and the second gas appliance has varied when the differential value is larger than the preset variation determination value.

11. The flow rate measuring device according to claim 10, wherein when the determining unit determines that one of the first gas appliance and the second gas appliance has stopped, the flow rate storage unit stores a total gas flow rate variation profile after the determination is made.

12. The flow rate measuring device according to claim 10, further comprising:

an appliance flow rate integrating unit configured to determine integrated flow rates used by the respective first and second gas appliance that are identified by the first appliance identifying unit,
wherein the flow rate storage unit stores the integrated flow rates determined by the appliance flow rate integrating unit, and includes:
a fixed flow rate storage unit configured to store, as fixed values, integrated flow rates of the respective first and second gas appliances determined by the appliance flow rate integrating unit to be activated, when the first and second gas appliances are used simultaneously and then the determining unit determines a stop of one of the first gas appliance and the second gas appliance; and
an unfixed flow rate storage unit configured to store, continuously after the stop of one of the first and second gas appliances is determined, an integrated flow rate value as an unfixed value when a value measured by the flow rate measurement unit is a predetermined flow rate or more,
wherein the second appliance identifying unit identifies a gas appliance corresponding to the unfixed value when the flow rate measurement unit measures the unfixed value.

13. The flow rate measuring device according to claim 12, wherein
when a value of a predetermined amount or more is stored in the unfixed flow rate storage unit, the second appliance identifying unit identifies a gas appliance corresponding to the unfixed value.

14. The flow rate measuring device according to claim 12, further comprising a control unit, wherein
when an unfixed value is stored in the unfixed flow rate storage unit and the second appliance identifying unit identifies a gas appliance in use, the control unit adds the unfixed value to an integrated flow rate of the gas appliance in use in the fixed flow rate storage unit.

15. The flow rate measuring device according to claim 9, wherein
an appliance registering unit stores, as gas flow rate variation profiles, at least one of a control registration values of gas flow rate and used flow rate ranges, of the respective first and second gas appliance, and
the second appliance identifying unit identifies a gas appliance having stopped second using at least one of the control registration values of gas flow rate and the used flow rate ranges.

16. The flow rate measuring device according to claim 9, further comprising
a clocking unit configured to measure use durations of the respective first and second gas appliances after the first appliance identifying unit determines that the first gas appliance and the second gas appliance are activated,
wherein the second appliance identifying unit identifies the gas appliance having stopped second based on the use duration measured by the clocking unit.

17. The flow rate measuring device according to claim 9, wherein
the flow rate measurement unit includes an ultrasonic flow meter.

18. A gas supply system comprising:
a gas supply pipe; and
the flow rate measuring device according to claim 9 coupled to the gas supply pipe.

19. A gas appliance identifying method comprising computer executable steps executed by a processor of a computer system to implement:
A) measuring a gas flow rate flowing in a flow channel;
B) storing at least first gas flow rate variation profiles exhibited a first gas appliance and a second gas appliance, respectively, upon activation thereof which are coupled to the flow channel, and second gas flow rate variation profiles exhibited by the first gas appliance and the second gas appliance, respectively, under control peculiar thereto;
C) determining a differential value of flow rate value data output in step A);
D) comparing the differential value determined in step C) with a preset variation determination value, thereby determining that states of the first gas appliance and the second gas appliance have varied when the differential value is larger than the variation determination value;
E) comparing a gas flow rate variation profile measured in step A) with the first gas flow rate variation profiles stored in step B), thereby identifying the first gas appliance and second gas appliance that are activated; and
F) when a stop of one of the first gas appliance and the second gas appliance is detected in step D), comparing a gas flow rate variation profile after the stop is detected with the second gas flow rate variation profile stored in step B), thereby identifying a gas appliance in use, a gas appliance having stopped of the gas appliances that are determined to be activated by the first appliance identifying unit.

20. A gas appliance identifying method comprising computer executable steps executed by a processor of a computer system to implement:
A) measuring a gas flow rate flowing in a flow channel;
B) storing at least first gas flow rate variation profiles exhibited by a first gas appliance and a second gas appliance, respectively, upon activation thereof which are coupled to the flow channel, and second gas flow rate variation profiles exhibited by the first gas appliance and the second gas appliance, respectively, under control peculiar thereto;
E) comparing a gas flow rate variation profile measured in step A) with the first gas flow rate variation profile stored in step B), thereby identifying the first gas appliance and second gas appliance that are activated;
G) storing a total gas flow rate variation profile; and
H) when it is detected in step A) that the gas flow ceases, comparing the total gas flow rate variation profile stored in step G) before the gas flow ceases with the second gas flow rate variation profile stored in the appliance registering unit, thereby identifying a gas appliance having stopped second, and a gas appliance having stopped first of the gas appliances that are determined to be activated by the first appliance identifying unit.

21. A flow rate measuring device for measuring and recording an amount of gas consumed by a respective of gas appliances, comprising:
a memory having a first storage in which an amount of gas consumed by a respective of identified gas appliances is storable and a second storage in which an amount of gas consumed by at least one unidentified gas appliance is storable;
a transition detector configured to detect an activation and a deactivation of the respective of gas appliances based on a differential value of a gas flow rate measured;
a first identifier responsive to a detection of activation by the transition detector to identify an activated gas appliance based on a gas consumption profile exhibited by the gas appliance during the activation;
a second identifier responsive to a detection of deactivation by the transition detector, after a plurality of gas appliances are respectively identified simultaneously in use by the first identifier, to monitor a gas flow rate measured subsequent to the detection of deactivation in search of a gas consumption profile discerned from the measured gas flow rate which is attributable to one among the plurality of gas appliances and identify a deactivated gas appliance and/or a gas appliance still being in use among the plurality of gas appliances;

an integrator configured to calculate, and store in the first storage, an amount of gas consumed by each of the plurality of gas appliances from an activation thereof till the detection of deactivation by the transition detector and also calculate, and store in the second storage, an amount of gas consumed after the detection of deactivation by the transition detector; and a controller responsive to an identification by the second identifier to distribute at least part of the amount of gas stored in the second storage to the first storage for a gas application determined to have consumed the at least part of the gas amount.

22. The flow rate measuring device according to claim 21, wherein the second identifier searches for any of the following gas consumption profiles:

a gas consumption profile exhibited under a combustion control peculiar to a particular gas appliance;

a gas consumption profile relating to a gas consumption rate peculiar to a particular gas appliance; and a gas consumption profile relating to a gas consumption duration peculiar to a particular gas appliance.

23. A method of measuring and recording an amount of gas consumed by a respective of gas appliances, comprising computer executable steps executed by a processor of a computer system to implement:

(a) providing a first storage in which an amount of gas consumed by a respective of identified gas appliances is storable and a second storage in which an amount of gas consumed by at least one unidentified gas appliance is storable;

(b) detecting an activation and a deactivation of the respective of gas appliances based on a differential value of a gas flow rate measured;

(c) responsive to an activation detected in step (b), identifying an activated gas appliance based on a gas consumption profile exhibited by the gas appliance during the activation;

(d) responsive to a deactivation detected in step (b), after a plurality of gas appliances are respectively identified simultaneously in use in step (c), monitoring a gas flow rate measured subsequent to the detection of deactivation in search of a gas consumption profile discerned from the measured gas flow rate which is attributable to one among the plurality of gas appliances and identifying a deactivated gas appliance and/or a gas appliance still being in use among the plurality of gas appliances;

(e) calculating, and storing in the first storage, an amount of gas consumed by each of the plurality of gas appliances from an activation thereof till the deactivation detected in step (b) and also calculating, and storing in the second storage, an amount of gas consumed after the deactivation detected in step (b); and (f) responsive to an identification in step (d), distributing at least part of the amount of gas stored in the second storage to the first storage for a gas application determined to have consumed the at least part of the gas amount.

24. The method according to claim 23, wherein monitoring a gas flow rate measured subsequent to the detection of deactivation in search of a gas consumption profile comprises searching for any of the following gas consumption profiles:

a gas consumption profile exhibited under a combustion control peculiar to a particular gas appliance;

a gas consumption profile relating to a gas consumption rate peculiar to a particular gas appliance; and a gas consumption profile relating to a gas consumption duration peculiar to a particular gas appliance.

* * * * *